US012718194B2

(12) United States Patent
Park

(10) Patent No.: US 12,718,194 B2
(45) Date of Patent: Aug. 25, 2026

(54) AREA BASED DELIVERY ORDER NOTIFICATION AND MANAGEMENT

(71) Applicant: Yum Connect, LLC, Louisville, KY (US)

(72) Inventor: Joseph R. Park, Plano, TX (US)

(73) Assignee: Yum Connect, LLC, Louisville, KY (US)

( * ) Notice: Subject to any disclaimer, the term of this patent is extended or adjusted under 35 U.S.C. 154(b) by 226 days.

(21) Appl. No.: 18/366,583

(22) Filed: Aug. 7, 2023

(65) Prior Publication Data

US 2024/0078509 A1 Mar. 7, 2024

Related U.S. Application Data

(60) Provisional application No. 63/374,525, filed on Sep. 2, 2022.

(51) Int. Cl.
*G06Q 10/087* (2023.01)

(52) U.S. Cl.
CPC .................................. *G06Q 10/087* (2013.01)

(58) Field of Classification Search
None
See application file for complete search history.

(56) References Cited

U.S. PATENT DOCUMENTS 11,940,286 B1 * 3/2024 O'Neil ............. G06Q 10/08355
12,141,742 B2 * 11/2024 Absher ............. G06Q 30/0635
2012/0253977 A1 10/2012 Mesaros
2019/0287062 A1 * 9/2019 Skaaksrud ........... G05D 1/0011
2020/0070717 A1 * 3/2020 Garden ................. G09F 21/048
2020/0349511 A1 * 11/2020 Seaver ............. G06Q 10/06312
2020/0410438 A1 * 12/2020 Shapira .............. G06Q 10/0832
2022/0198355 A1 6/2022 Menachem
2022/0398532 A1 * 12/2022 Ni ........................ G06Q 10/047
2025/0029057 A1 * 1/2025 Rellas .................. G06Q 10/047

OTHER PUBLICATIONS

International Search Report and Written Opinion issued Nov. 7, 2023 regarding International Application No. PCT/US2023/071874, 11 pages.

* cited by examiner

*Primary Examiner* — William J Jacob
(74) *Attorney, Agent, or Firm* — Foley & Lardner LLP

(57) ABSTRACT

A method includes receiving at a computing platform communicatively connected to a system of nodes, an initial order to be physically fulfilled by one or more nodes of the system of nodes. The method further includes determining a fulfilment criterion and a local fulfillment constraint for the initial order. The method also includes generating, based on at least one of the initial order, the fulfilment criterion for the initial order, and the local fulfilment constraint for the initial order, one or more conditional optimization opportunities. The method further includes generating, an optimized set of control inputs and sending the optimized set of control inputs to the nodes for physically fulfilling the initial order and realizing the at least one of the one or more conditional optimization opportunities.

14 Claims, 15 Drawing Sheets

FIG. 5A
AREA
506d
AREA
506e
500
AREA
506a
502b
502a
AREA
506c
AREA
506b
504
502c
AREA
506f

AREA BASED DELIVERY ORDER NOTIFICATION AND MANAGEMENT

CROSS-REFERENCE TO RELATED APPLICATION AND PRIORITY CLAIM

This application claims priority under 35 U.S.C. § 119(e) to U.S. Provisional Patent Application No. 63/374,525 filed on Sep. 2, 2022. This provisional application is hereby incorporated by reference in its entirety.

TECHNICAL FIELD

This disclosure relates generally to electronic commerce. More specifically, this disclosure relates to operating a service to determine, arrange and manage the sequencing and logistics of multiple orders in a defined geographic area.

BACKGROUND

The use of electronic devices has greatly expanded largely due to their usability, convenience, computing power, and the like. One result of the recent technological development is that the functions performed by a given electronic device are increasing. For example, some electronic devices support functions such as participating in electronic commerce, digital media playback, game play, electronic book (e-book) reading, digital image capture, calendar scheduling, wireless communications, Internet searching, to name a few. Electronic commerce, typically understood as the buying or selling products or services over the Internet using an electronic device, straddles the worlds of computing and execution of physical processes, and as such, presents new and unique technical and practical challenges.

The technical challenges associated with e-commerce include, without limitation, generating control inputs for the physical resources associated with fulfilling an online transaction in a way that maximizes efficiency and system throughput. For many species of e-commerce, there may be a plurality of physical resources which can receive control inputs for fulfilling the online transaction. However, in many cases, the control logic for generating and providing control inputs to a localized set of physical resources is lacking and fails to optimize any specific metrics (for example, energy consumption, utilization rate, etc.) is deficient or non-existent. Accordingly, improving the apparatus for generating and issuing control inputs to the local nodes of a system for receiving and fulfilling online orders for physical goods and services remains a source of technical challenges and opportunities for improvement in the art.

SUMMARY

This disclosure provides a method and apparatus to determine, arrange, and manage the sequencing and logistics of multiple orders in a defined geographic area.

In one embodiment, a method includes receiving, at a computing platform communicatively connected to a system of nodes, an initial order to be physically fulfilled by one or more nodes of the system of nodes, wherein the initial order specifies a location and quantity parameters of fulfilment. The method further includes, determining, at the computing platform, a fulfilment criterion for the initial order; determining, at the computing platform, a local fulfilment constraint for the initial order, and determining, based on at least one of the initial order, the fulfilment criterion for the initial order and the local fulfilment constraint for the initial order, one or more conditional optimization opportunities, wherein each of the one or more conditional optimization opportunities comprises an action, which if taken, improves one or more performance metrics of the system of nodes. Still further, the method includes generating a conditional input for optimization, wherein the conditional input for optimization defines an additional task to be taken by a node of the system, sending the conditional input for optimization to at least one node of the system, receiving, within an optimization window, a response from the at least one node, wherein the response satisfies a condition of the conditional input for optimization, generating, based at least in part on the response from the at least one node an optimized set of control inputs, wherein the optimized set of control inputs define actions to be taken by nodes to physically fulfil the initial order and realize at least one of the one or more conditional optimization opportunities and sending the optimized set of control inputs to the nodes for physically fulfilling the initial order and realizing the at least one conditional optimization opportunities.

In an embodiment, an apparatus includes a communication interface communicatively connected to one or more nodes of a system of nodes and a processor configured. The processor is configured to receive, at the apparatus, an initial order to be physically fulfilled by one or more nodes of the system of nodes, wherein the initial order specifies a location and quantity parameters of fulfilment. The processor is further configured to determine a fulfilment criterion for the initial order. determine a local fulfilment constraint for the initial order and determine, based on at least one of the initial order, the fulfilment criterion for the initial order and the local fulfilment constraint for the initial order one or more conditional optimization opportunities, wherein each of the one or more conditional optimization opportunities comprises an action, which if taken, improves one or more performance metrics of the system of nodes. Still further, the processor is configured to generate a conditional input for optimization, wherein the conditional input for optimization defines an additional task to be taken by a node of the system, send the conditional input for optimization to at least one node of the system via the communication interface, receive, within an optimization window, a response from the at least one node, wherein the response satisfies a condition of the conditional input for optimization, generate based at least in part on the response from the at least one node an optimized set of control inputs, wherein the optimized set of control inputs define actions to be taken by nodes to physically fulfil the initial order and realize at least one of the one or more conditional optimization opportunities, and send the optimized set of control inputs to the nodes for physically fulfilling the initial order and realizing the at least one conditional optimization opportunities.

In an embodiment, non-transitory, computer-readable medium includes code, which, when executed by a processor, causes an apparatus to receive, at the apparatus, an initial order to be physically fulfilled by one or more nodes of a system of nodes communicatively connected to the apparatus, wherein the initial order specifies a location and quantity parameters of fulfilment, determine a fulfilment criterion for the initial order. The processor is further configured to determine a local fulfilment constraint for the initial order, determine, based on at least one of the initial order, the fulfilment criterion for the initial order and the local fulfilment constraint for the initial order, one or more conditional optimization opportunities, wherein each of the one or more conditional optimization opportunities comprises an action, which if taken, improves one or more performance metrics of the system of nodes, generate a conditional input for optimization, wherein the conditional input for optimization defines an additional task to be taken by a node of the system, send the conditional input for optimization to at least one node of the system, receive, within an optimization window, a response from the at least one node, wherein the response satisfies a condition of the conditional input for optimization, generate based at least in part on the response from the at least one node an optimized set of control inputs, wherein the optimized set of control inputs define actions to be taken by nodes to physically fulfil the initial order and realize at least one of the one or more conditional optimization opportunities, and send the optimized set of control inputs to the nodes for physically fulfilling the initial order and realizing the at least one conditional optimization opportunities.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
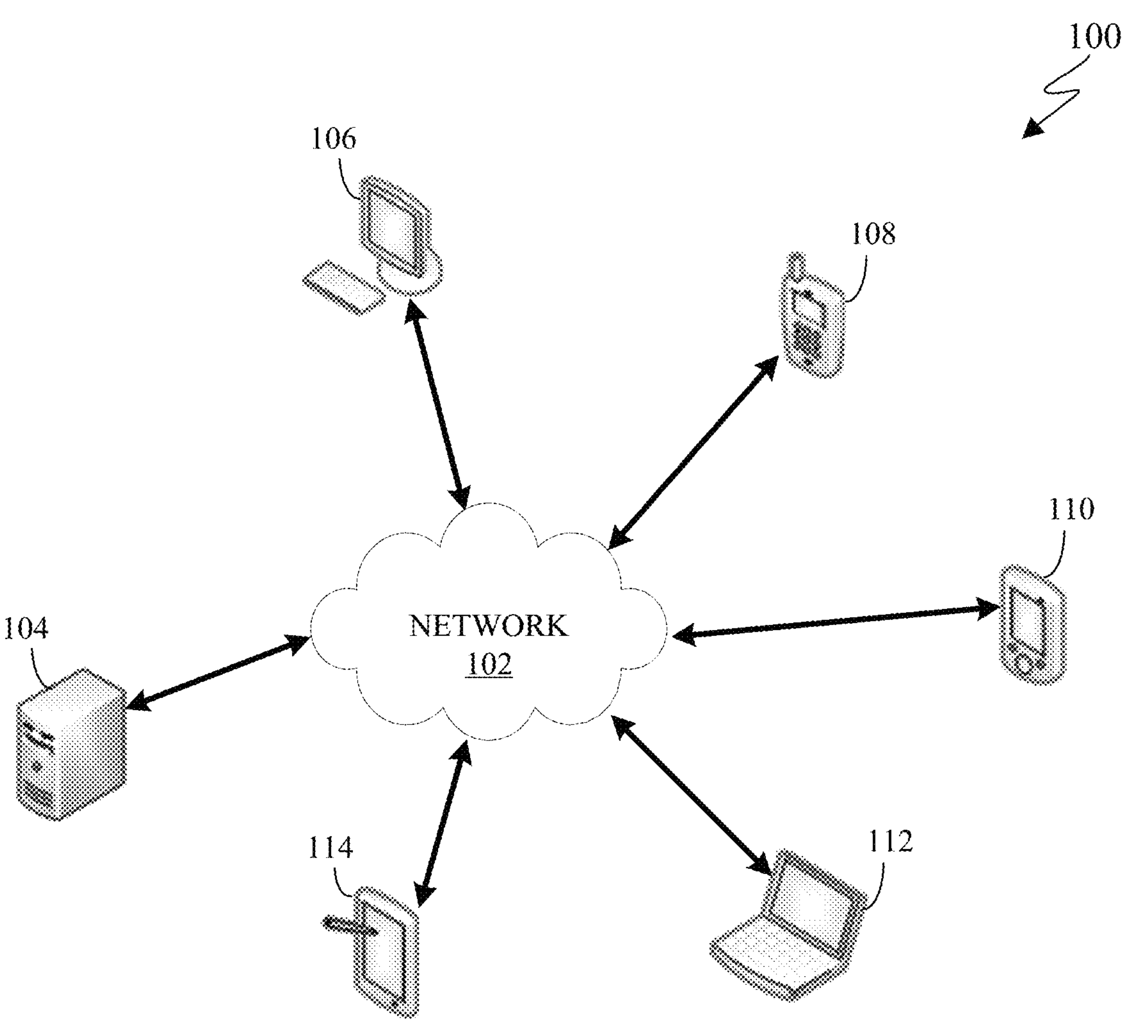
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user," "consumer," "operator," "service provider," "manager," "employee" or the like, may denote a human or another device (such as an artificial intelligent electronic device) using the electronic device.

Embodiments of the present disclosure optimize the efficiency of a network of nodes for fulfilling an online order by leveraging data as to local demand to initiate further online orders, thereby improving utilization and efficiency of the system as a whole. For example, in certain embodiments, a server implementing control logic for issuing control inputs to the nodes of a networked system for fulfilling and order can take into consideration that a seller of goods or services can motivate and encourage consumers to purchase goods or services by offering coupons, discounts, or rewards that can be redeemed for a current or a future purchase. For example, a restaurant can offer to waive a fee for delivering food and/or beverages, offer free food and/or beverages, or discounted food and/or beverages to encourage a consumer to order food and/or beverages from their establishment.

Embodiments of the present disclosure provide systems and methods for motivating and encouraging consumers (also referred to as customers, and users) in a particular geographic area to purchase goods or services from a seller (also referred to as a merchant). For example, consumers who are located within a predefined distance from one another may receive additional discounts based on the number of persons in that area that place orders within a period of time. Increasing the discounts may incentives consumers to increase the number of sales for that area.

For example, a service provider such as an exterminator, can treat more residences for pests in less time when the residents are closer together. For another example, a delivery service can deliver ordered goods to consumers faster when the delivery locations are near each other. In both of these examples, more goods or services are be provided to customers with less overhead. For instance, less gasoline is needed to deliver the goods (or provide services) to consumers who live blocks away as compared consumers who live miles away. Additionally, the delivery of goods to consumers who live blocks away takes less time than delivering goods to consumers who live miles apart. Moreover, by delivering the goods in less time allows more deliveries can occur or services to be provided, which can increase the efficiency and throughput of the system as a whole.

Embodiments of the present disclosure also provide systems and methods for providing control logic at a back-end server for improving the efficiency of the system by optimizing the delivery sequence and routes to maximize the number of deliveries starting from the location of the consumer who places the first order in a certain area.

Embodiments of the present disclosure further provide efficiency and throughput improvements by providing control logic which accounts for the production capacity at each node of the system responsible for fulfilling the order (for example, determining the number of goods that can fit into a single delivery vehicle). For example, one or more delivery cars may be utilized to make the deliveries of the ordered goods based on the size of the delivery car, the number of orders, and the size of each order. Embodiments of the present disclosure also describe methods to offload orders to a similar area to multiple vehicles if the orders are too large for delivery by a single vehicle.

Additionally, embodiments of the present disclosure provide systems and methods increasing the efficiency and throughput of a system for fulfilling internet-initiated transactions by programmatically generating incentives for users within a certain proximity to one another to order goods for delivery or services. For example, as the number of persons who live in the similar area place orders within a certain time window, the larger the incentive can be. For another example, the inventive can be a particular offer (such as free delivery or discounted food and/or drinks) when a certain condition is satisfied, such as if a certain number of persons within a certain radius place an order.

The incentives could be time based. For example, consumers who are located within a similar area can be given a period of time (such as five minutes) to purchase goods or servers, in order to receive discounted goods, discounted delivery fees, or discounts on services rendered. The incentives can also be limited based on order sizes. For example, the incentive can be discontinued if the vehicle used to deliver the goods purchased reaches capacity. For another example, the incentive can be discontinued if the time allotted to each requested service reaches a threshold time. For example, each service rendered could take a certain amount of time to complete, as such only a certain quantity of services (based on service type) can be rendered within a given time period.

Embodiments of the present disclosure also provides systems and methods for by which the control apparatus for a system for fulfilling internet-initiated requests can increase system utilization and efficiency by determining and sending control inputs which provide incentives to users within a certain proximity to one another. The incentives can be provided by a push notification, an email, a text message, and the like. For example, after a first person places an order, incentives can be determined and distributed to users who are in proximity of the first person.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 102, which facilitates communication between various components in the system 100. While, in the illustrative example of FIG. 1, certain components of system 100 are represented as computing devices, embodiments according to the present disclosure are not so limited, and system 100 can include apparatus configured to receive control inputs from other nodes of system 100 connected through network 102. For example, the network 102 may communicate Internet Protocol (IP) packets or other information between network addresses. The network 102 may include one or more local area networks (LANs); metropolitan area networks (MANs); wide area networks (WANs); a virtual private network (VPN); all or a portion of a global network, such as the Internet; or any other communication system or systems at one or more locations.

The network 102 facilitates communications among various servers, such as the server 104 and various client devices, such as the client devices 106-114. The server 104 may be any suitable electronic computing or processing device(s) that can provide computing services including software for one or more client devices 106-114. The server 104 could, for example, include one or more processing devices, one or more memories storing instructions and data, and one or more network interfaces facilitating communication over the network 102. For example, as discussed in greater detail below, the server 104 may provide or manage distribution of incentives to consumers using one or more of the client devices 106-114 in a particular geographical area. For another example, as discussed in greater detail below, the server 104 may manage a reward system based on a number of orders and/or size of the orders from the one or more of the client devices 106-114. The reward system can incentive users to place orders via one or more of the client devices 106-114. For another example, as discussed in greater detail below, the server 104 can optimize the route for a delivery driver to deliver goods to the location of the one or more of the client devices 106-114. For another example, as discussed in greater detail below, the server 104 can determine the quantity of goods that can fit into each delivery vehicle and provide an indication to dispatch multiple delivery vehicles if needed. For another example, as discussed in greater detail below, the server 104 can provide an indication to dispatch multiple delivery vehicles upon a determination that a single delivery vehicle cannot deliver the ordered goods within a certain time window. For yet another example, as discussed in greater detail below, the server 104 can be located in a merchant's shop that receives orders from one or more of the client devices 106-114.

Each client device 106-114 represents any suitable electronic computing or processing device that interacts with at least one server or other computing device(s) over the network 102. In this example, the client devices 106-114 include a desktop computer 106, a mobile telephone or smartphone 108, a personal digital assistants (PDAs) 110, a laptop computer 112, a tablet computer 114, a video game console, a set-top box and/or television, a virtual assistant, and the like. However, any other or additional client devices could be used in the networked system 100. For example, any Internet or network connectable device or Internet of Things (IoT) device (e.g., Smart TVs, refrigerators, Raspberry PIs, etc.) could be used for one of the client devices 106-114 in system 100. For another example, remotely controlled palletizers or warehouse robots can also be used as one of the client devices 106-114 in system 100.

As discussed below, in various embodiments, client devices 106-114 participate, under the coordination of server 104, in electronic commerce (E-Commerce) for physically fulfilling orders or other processes (for example, purchasing goods or services) initiated over the internet. For example, as discussed herein, the client devices 106-114 may be run applications from a certain merchant used to place orders (such as purchasing goods/services) or have access to a web browser and place orders (such as purchasing goods/services) via a webpage associated with the merchant.

Although FIG. 1 illustrates one example of a networked system 100, various changes may be made to FIG. 1. For example, the system 100 could include any number of each component in any suitable arrangement and each of servers 102-104 and client devices 106-114 may be representative of any number of servers and/or client devices that are part of system 100. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
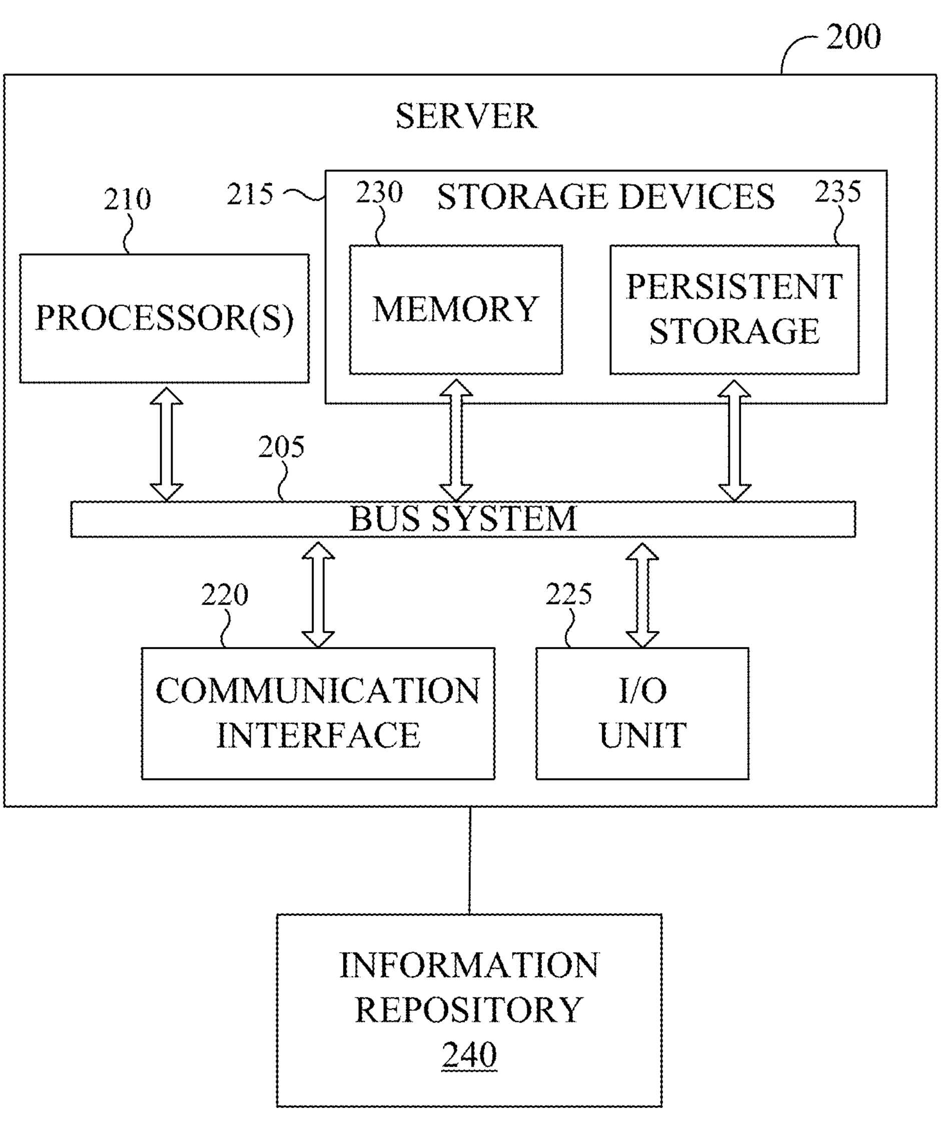
FIGS. 2 and 3 illustrate example electronic devices in accordance with an embodiment of this disclosure.
Figure 3:
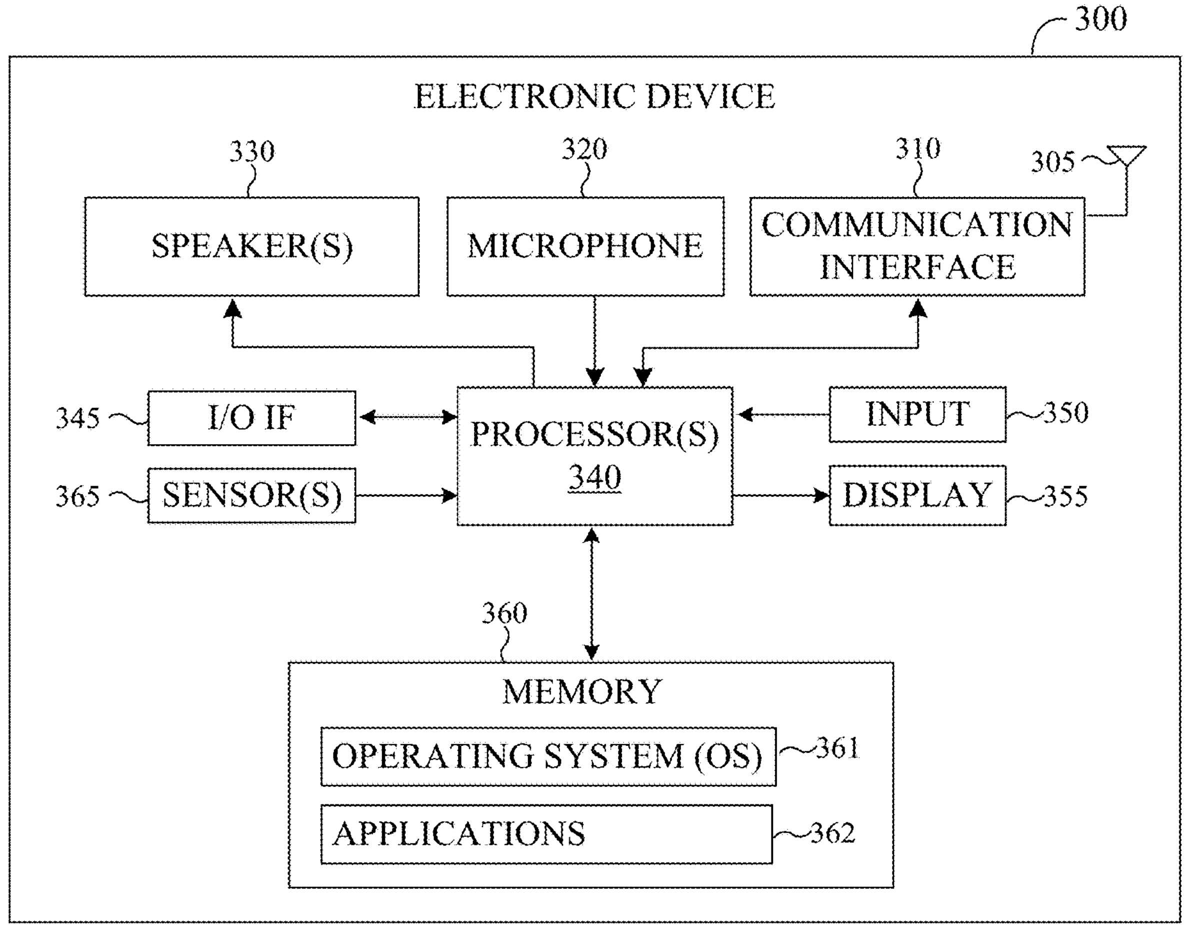

FIGS. 2 and 3 illustrate example electronic devices according to various embodiments of the present disclosure. In particular, FIG. 2 illustrates an example server 200, and FIG. 3 illustrates an example electronic device 300. In this illustrative example, the server 200 represents the server 104 in FIG. 1, and the electronic device 300 could represent one or more of the client devices 106-114 in FIG. 1.

As shown in FIG. 2, the server 200 includes a bus system 205, which supports communication between processor(s) 210, storage devices 215, communication interface 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215, which comprise any apparatus capable of storing and facilitating retrieval of digitally-recorded information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a read-only memory, hard drive, Flash memory, or optical disc. For example, persistent storage 235 may store one or more databases of data, client applications, reward systems (including accrued rewards) and the like.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The server 200 can be operably connected to an information repository 240. Information repository 240 may, in some instances, be an array of storage devices (for example, hard drives) physically connected to processor(s) 210. In some embodiments, information repository 240 may be shared or virtualized storage, (for example, cloud storage) connected to server 200 via network 102. For example, the information repository 240 is included in the storage devices 215. For another example, the information repository 240 is externally located of the server 200. If the information repository 240 is externally located, the server 200 can access information from the information repository 240 via wired or wireless means. In certain embodiments, the information repository 240 can be similar to the memory 230. In certain embodiments, the information repository 240 can be similar to the persistent storage 235.

The information repository 240 can include information concerning customers of a particular merchant. For example, the information repository 240 can include a log that details information associated with each customer of a merchant. The log can include order history, address, and the like. For example, the information repository 240 can include purchase history information of each customer who has purchased goods from a certain merchant. For another example, the information repository 240 can include addresses of consumers who have purchased goods from a certain merchant. According to various embodiments, information repository contains a set of training data obtained from systems outside of system 100 for initial training of machine learning (ML) predictive models for generating baseline predictions as to the effect of one or more local constraints (for example, traffic, weather, a sporting event) on the nodes of network 100's ability to physically fulfill an order received over network 102 at server 200.

Although FIG. 2 illustrates one example of a server 200, various changes may be made to FIG. 2. For example, various components in FIG. 2 could be combined, further subdivided, or omitted and additional components could be added according to particular needs. As a particular example, while depicted as one system, the server 200 may include multiple server systems that may be remotely located. In another example, different server systems may provide some or all of the processing, storage, and/or communication resources for synchronization and engagement purposes in accordance with various embodiments of the present disclosure.

FIG. 3 illustrates an example electronic device 300 according to embodiments of the present disclosure. The embodiment of the electronic device 300 illustrated in FIG. 3 is for illustration only, and one or more of the client devices 106-114 of FIG. 1 could have the same or similar configuration. However, client devices come in a wide variety of configurations, and FIG. 3 does not limit the scope of this disclosure to any particular implementation of an electronic device.

As shown in FIG. 3, the electronic device 300 includes an antenna 305, a communication interface 310, a microphone 320, and a speaker 330. The electronic device 300 also includes a processor 340, and I/O interface 345, an input 350, a display 355, a memory 360, and a sensor(s) 365. The memory 360 includes an operating system (OS) 361 and one or more applications 362.

The communication interface 310 can be similar to the communication interface 220 of FIG. 2. The communication interface 310 supports communications with other systems or devices. For example, the communication interface 310 could include a network interface card or a wireless transceiver facilitating communications over the network 102. The communication interface 310 may support communications through any suitable physical or wireless communication link(s). For embodiments utilizing wireless communication, the communication interface 310, can include an RF transceiver, a BLUETOOTH transceiver, a WI-FI transceiver, a ZIGBEE transceiver, an infrared transceiver, a radio frequency identifier (RFID) tag (e.g., active, or passive) and various other transceivers for receiving and/or transmitting wireless communication signals. The communication interface 310 can receive (via the antenna 305) an incoming RF signal using a variety of wireless communication protocols, (such as BLUETOOTH, Wi-Fi, cellular, LTE communication protocols, or the like). The signal can be transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication interface 310 can also receive, from the processor, data to be transmitted via an RF signal to an access point or another device of the network 102.

The microphone 320 according to an embodiment may receive a sound and convert the sound into an electrical signal. The received sound can be in the audible spectrum, the non-audible spectrum, or both.

The speaker 330 according to an embodiment may output electrical signal as a sound. For example, the speaker 330 may output sound signals to the outside of the electronic device 300. The speaker 330 may be used for general purposes, such as playing audio content. In certain embodiments, the speaker 330 can output sound in both the audible and non-audible spectrum.

The processor 340 can include one or more processors or other processing devices. The processor 340 can execute instructions that are stored in the memory 360, such as the OS 361 in order to control the overall operation of the electronic device 300. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute one or more applications 362 based on the OS 361 or in response to signals received from external source(s) or an operator. Example, applications 362 can include shopping applications, video games, videos, location identification applications (such as global positioning system (GPS)), VR or AR application, a camera application (for still images and videos), a video phone call application, an email client, a social media client, a SMS messaging client, a virtual assistant, and the like.

The processor 340 is also coupled to the I/O interface 345 that provides the electronic device 300 with the ability to connect to other devices, such as any of the client devices 106-114. The I/O interface 345 is the communication path between these accessories and the processor 340. Additionally, in embodiments in which electronic device 300 is an apparatus for completing a task in a sequence of operations for physically fulfilling an internet-based order subject to localized constraints, control signals for components of the apparatus may be passed through I/O interface 345. For example, in a case where electronic device is a "smart" or network-connected oven or other piece of kitchen apparatus, signals to raise the temperature of the oven (for example, from a "warm" standby temperature to an active cooking temperature") may be passed through I/O interface 345.

The processor 340 is also coupled to the input 350 and the display 355. The operator of the electronic device 300 can use the input 350 to enter data or inputs into the electronic device 300. The input 350 can be a keyboard, a touchscreen, a mouse, a track ball, a controller (such as a video game controller), a joystick, a voice input, a sound or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor/camera), a depth sensor, a D-RGB sensor (depth Red Green Blue sensor/camera), a location sensor (such as GPS), an RFID receiver, and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Embodiments of the present disclosure describe various methods for generating control inputs for nodes (for example, client devices 106-114 in FIG. 1) of a networked system for physically fulfilling requests for locally-provided goods and services received at a server (for example, server 104) over a network in a way that leverages data regarding local constraints to optimize one or more performance metrics of the system.

For example, certain embodiments according to the present disclosure can improve system throughput and efficiency on orders for providing goods and services in a localized geographic region by incentivizing potential customers located within the same localized geographic region to also electronically place orders for goods and services to be fulfilled by nodes of the system. In certain embodiments, the goods can be sold by one business and delivered by another business. In other embodiments a single business can both sell and deliver the goods to a buyer. Embodiments of the present disclosure take into consideration multiple networks of nodes for physically fulfilling and order—that the business can be a standalone business, a franchise, or business with multiple locations. For example, the business can be a restaurant that has a single location or multiple locations, which can be franchised or owned or one or more entities (such as a company).

Figure 5A:
FIGS. 5A-5D illustrate example maps for arranging multiple orders in a similar geographic area in accordance with an embodiment of this disclosure.

For example, a certain business, such as a restaurant franchise may be constrained to sell its food and/or beverages within certain geographic areas (also denoted as trade areas or trade zones). The boundary of a geographic area can be defined by certain landmarks (such as a street), geographical features (such as a river), distance from the restaurant, and the like. These boundaries can be used to avoid competition between franchise owners of the same business, such as illustrated in FIG. 5A.

To optimize one or more of total efficiency or system throughput by incentivizing action among potential customers satisfying common geographic constraints, certain embodiments of the present disclosure describe a process of targeting certain previous customers that are within a certain geographic area or distance from one another. For example, when a first customer electronically places an order with a merchant (such as an order for food to be fulfilled by being made and delivered from a restaurant), a server or other electronic device (for example, electronic device 300 in FIG. 3) can identify the location of the first customer. Based on the location of the first customer, the electronic device can then identify previous customers that are within a predefined distance from the first customer. The electronic device can then send to the identified customers (that are within a predefined distance from the first customer) discounts on their food, beverage, and/or delivery.

For another example, a merchant of a seller of goods or services, such as a restaurant, can select a particular geographic area as its service area and provide the selected area, to a back-end server either directly, or through a client device of the larger system (for example, system 100 in FIG. 1). An electronic device, typically, a back-end server implementing one or more algorithms providing control logic for generating and distributing control inputs to client devices operating at nodes of the networked system, can identify all previous customers that are within the geographic area and send a notification to electronic devices of those customers. The customers can be identified using information stored in an information repository (such as the information repository 240 of FIG. 2). The information can include addresses of customers who were previous customers of the seller. The notification can indicate one or more incentives, incentivizing the user to order food from the merchant.

Figure 4A:
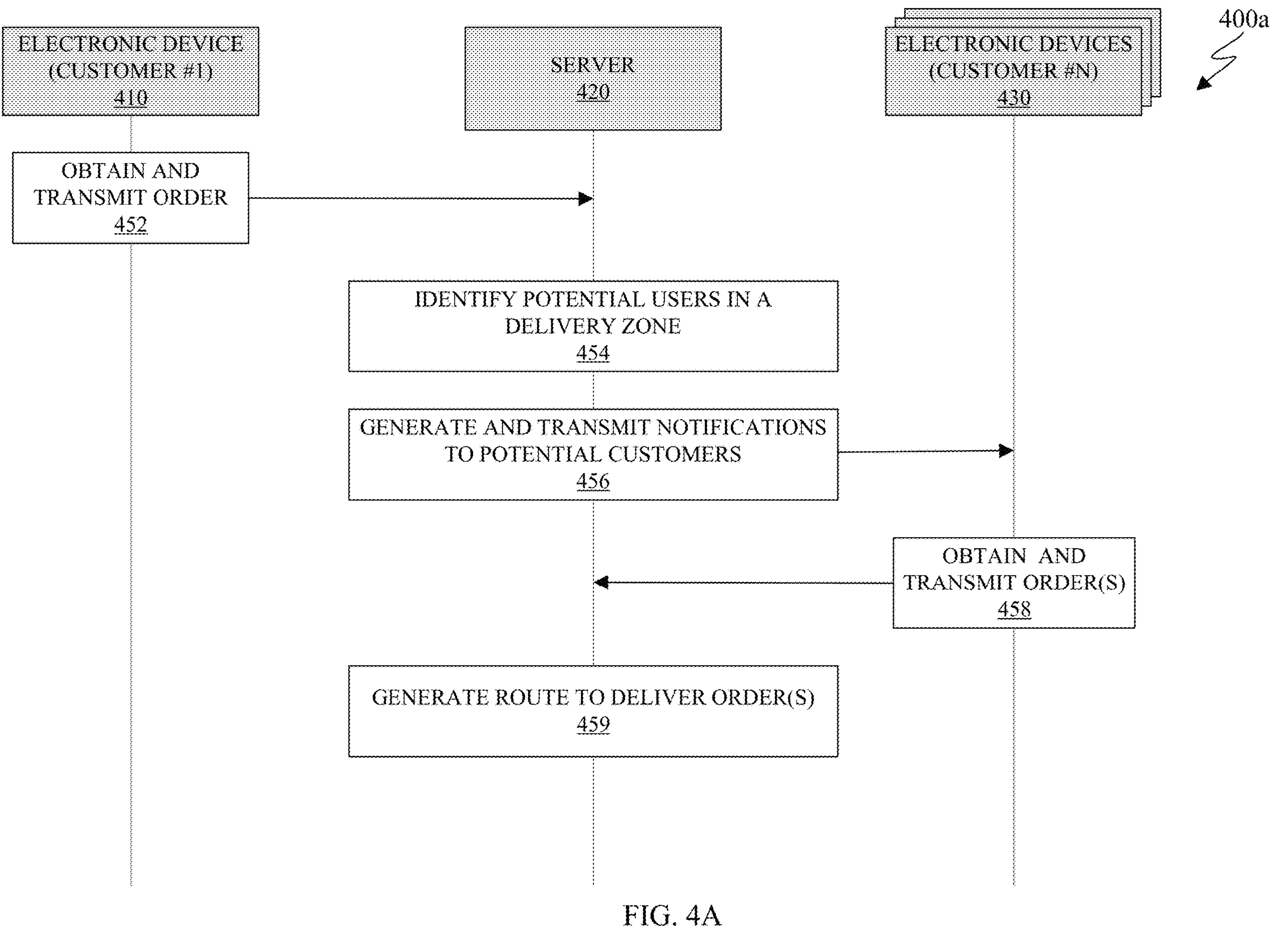
FIGS. 4A and 4B illustrate example timing diagrams in accordance with an embodiment of this disclosure.
Figure 4B:
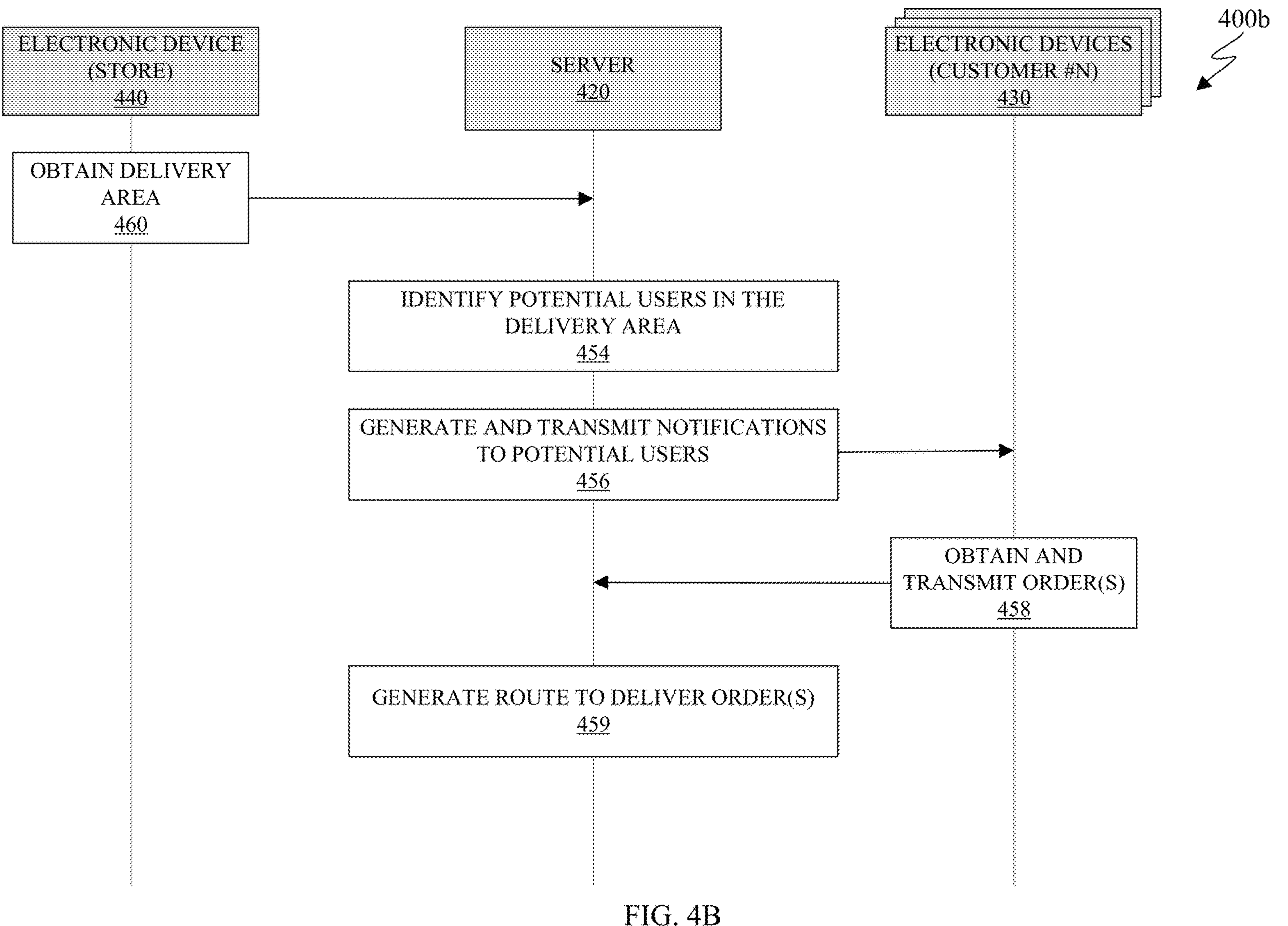

FIGS. 4A and 4B illustrate example timing diagrams 400*a* and 400*b*, respectively, in accordance with an embodiment of this disclosure. The illustrative examples of FIGS. 4A and 4B show how back-end control systems (for example, server 420) according to the present disclosure can determine and issue control inputs for downstream apparatus to enhance one or more metrics of overall system performance in a networked system for localized physical fulfillment of an online order. The steps of the timing diagrams 400*a* and 400*b* can be performed by the server 104 of FIG. 1 or any of the client devices 106-114 of FIG. 1 and include internal components of the similar to the server 200 of FIG. 2 and the electronic device 300 of FIG. 3. Timing diagrams 400*a* and 400*b* are for illustration only and other embodiments can be used without departing from the scope of the present disclosure.

Referring to the non-limiting example of FIGS. 4A-4B, timing diagrams 400*a* and 400*b* describe the process of arranging multiple orders in a similar geographic area. However, the timing diagram 400*a* of FIG. 4A is initiated when a customer using the electronic device 410 generates and transmits an order (step 452), while the timing diagram 400*b* of FIG. 4B is initiated when an employee of a business using the electronic device 440 selects an area for delivery area.

The timing diagram 400*a* of FIG. 4A illustrates signals transmitted and received between an electronic device 410, and a server 420, and one or more electronic devices 430. The timing diagram 400*b* of FIG. 4B illustrates an electronic device 440, and the server 420, and one or more electronic devices 430. It is noted that the server 420 of FIG. 4A can be the same or different than the server 420 of FIG. 4B. Similarly, the one or more electronic devices 430 of FIG. 4A can be the same or different than the one or more electronic devices 430 of FIG. 4B.

The electronic device 410 (of FIG. 4A), the one or more electronic devices 430 (of FIGS. 4A and 4B), and the electronic device 440 (of FIG. 4B) can be similar to any of the client devices 106-114 of FIG. 1 and comprise internal components similar to the electronic device 300 of FIG. 3. Similarly, the server 420 (of FIGS. 4A and 4B) can be similar to any of the server 104 of FIG. 1 and include internal components similar to the server 200 of FIG. 2.

In certain embodiments, the electronic device 410 (of FIG. 4A) can be used by a consumer (customer) placing an order to be physically fulfilled by nodes of the networked system, subject to localized constraints, while the electronic device 440 (of FIG. 4B) is associated with a particular store, such as a restaurant and used by a merchant at the store itself. The one or more electronic devices 430 can be used by various persons within a particular geographic area identified by the server 420.

Figure 7A:
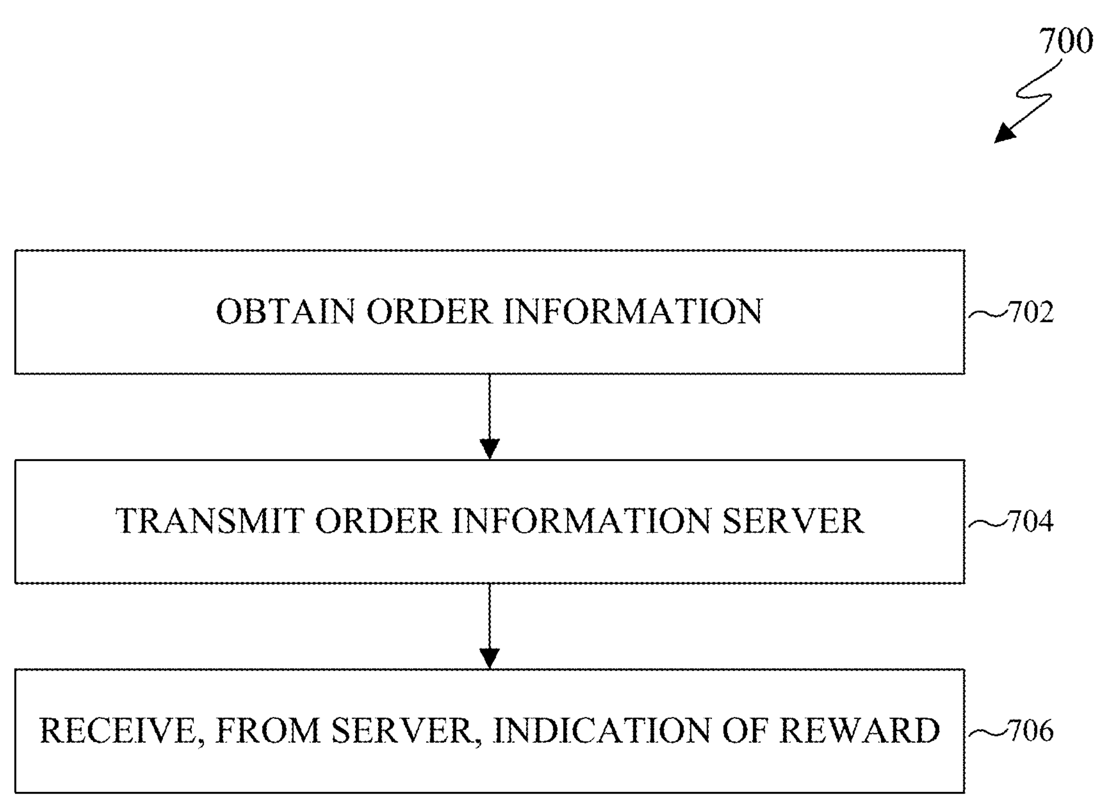
FIG. 7A illustrates an example method for a consumer placing an order in accordance with an embodiment of this disclosure.

As illustrated in the timing diagram 400*a* of FIG. 4A, the electronic device 410 obtains an order and transmits the order via a network (for example, network 102 in FIG. 1) to the server 420 (step 452). A user, denoted as customer #1, may provide the order to the electronic device 410 via an input (such as the input 350 of FIG. 3B). In certain embodiments, the order can be placed using an application associated with a particular retail store. In certain embodiments, the order can be placed via a web page of a particular retail store. The order can be for a product (such as food, groceries, household products, and the like) that is to be delivered to a certain location (a physical geographic address). According to certain embodiments, the order comprises a set of parameters for which control logic implemented at server 420 must develop a set of control inputs to other nodes of the system (for example, an electronic device used by a delivery driver) to physically fulfill the order. Further, in certain embodiments, the control inputs generated at server 420 must satisfy one or more localized constraints or optimization parameters. The location can be included in the transmitted order, such as the address that the goods are to be delivered. In certain embodiments, the electronic device 410 can be located in a different location that the location that the goods are to be delivered. Step 452 is described in greater detail below in the method 700 as illustrated in FIG. 7A.

After server 420 receives the order, at step 454, server 420 identifies potential persons satisfying one or more localized constraints. In this illustrative example, the localized constraints include that potential people be in a delivery zone in a predetermined proximity to the location that the order from the electronic device 410 is to be delivered. For example, the server 420 can utilize information from an information repository (such as the information repository 240 of FIG. 2) to identify potential persons who are in the delivery zone in proximity to the location that the order of Customer #1 is to be delivered too. For instance, the server 420 can compare addresses of previous customers to the delivery address of the order received from the electronic device 410 to determine which, if any, previous customers satisfy geographical constraints similar to those of Customer #1. The delivery zone can be an area within a predefined distance from the location associated with the order received from the electronic device 410. The server 420 can then filter the addresses of previous customers based on a distance to the delivery address of the order received from the electronic device 410. For example, the server 420 can select previous customers whose address are within the predefined distance to the delivery address of the order received from the electronic device 410.

In certain embodiments, the server 420 can implement a capacity/bandwidth availability type algorithm to refine the set of potential customers to those satisfying additional localized constraints. For example, the availability type algorithm can be a car storage model to determine the maximum size of the orders that can be delivered based on the size of the delivery vehicles in the area, and which are available to deliver the order, and generate a localized set of control inputs based thereupon. For example, the server 420 can calculate the quantity of goods to be delivered that can safely fit within each delivery vehicle. In some embodiments, implementing the availability type algorithm includes populating a database of capacity information regarding the available delivery vehicles' sizes and ranges. For example, the database may be populated with the types of vehicles each driver owns. In this way, the algorithm may account for drivers who have access to larger vehicles (for example, sport utility vehicles) and the drivers whose carrying capacity is more constrained (for example, drivers of compact cars of motorcycles). In some embodiments, the availability type algorithm may be predictive and configured to infer each delivery vehicle's carrying capacity based on historical data (for example, the maximum number of items carried on a previous delivery trip) or other parameters of the order (for example, a delivery distance which exceeds a threshold value for smaller vehicles such as bicycles, or motorcycles, and which requires the use of a larger-capacity vehicle). As another example, the server 420 can calculate the number of different orders that can be delivered within the delivery zone within a certain time window. The time window can be based on a time that the food will cool down (if the food is to be delivered warm) or warm up (if the food is to be delivered cool), based on packaging techniques, outside temperature, and the like. The number of goods that can fit in a car and/or the number of orders can be delivered within a time window can be used as parameters for limiting how many orders can be placed in a group order. If the group order reaches capacity, a second group order can be initiated.

In step 456, the server 420 can generate and transmit a notification to the selected customers (identified potential users who are in the delivery zone of the customer #1). In this way, the system seeks to obtain further orders at server 420, in order to maximize the utilization of the resources associated with fulfilling the order received at step 452. The notification can be sent via a push notification, a text message, an email, or the like. In certain embodiments, the server 420 can identify preferred methods on how each of the identified potential customers wish to receive marketing information. The server 420 can then send notifications to the electronic devices 430 associated with the selected persons, based on the preferred method of each person. In certain embodiments, the notification can include an incentive for the person to place an order. In certain embodiments, the notification can include a time window during which the order is to be received, in order to obtain the incentive. The incentive can be a discount of the goods purchase, a discount on the delivery, or the like. The notification can also indicate that the incentive is only available if the order is to be delivered to a certain address (such as the address that is indicated in the information repository and associated with the customer).

The notifications can be received by the electronic devices 430. When one or more of the electronic devices 430 receive the notification, none, one or more of the electronic devices 430 may transmit an order, that is received by the server 420 (step 458). For example, the electronic devices 430 can provide the notification to the user (such as by displaying the notification on a display such as the display 355 of FIG. 3 or audibly projecting the notification via a speaker such as the speaker 330 of FIG. 3). The user can decide whether to place an order.

The incentive provided in the notification can expire after a certain period of time or upon satisfaction of one or more other predefined conditions. In some embodiments, the predefined condition is that adding to a current order will exceed the capacity of local resources for fulfilling further orders. For example, if the vehicle used to deliver the received orders (such as to the location indicated by customer #1 and the location of one or more of the customers associated with the electronic devices 430, that placed the order) is at capacity, the incentive can expire.

One or more of the electronic devices 430 can obtain an order (via an input from a user) and transmit the obtained order to the server 420.

After a certain period of time or the occurrence of a predetermined event, the server 420 concludes the group order (orders from the electronic device 410 associated with customer #1 and zero or more electronic devices 430) and generates a route to deliver the group order (step 459). The delivery route can be optimized in order to maximize one or more parameters, such as delivering the order in the least amount of time. In certain embodiments, the server 420 can identify additional nodes of the network as resources for physically fulfilling the order. For example, server 420 may identify addition additional delivery vehicles to deliver the group order and issue control inputs to utilizes these nodes.

It is noted that FIG. 4A and its corresponding description below, describes the steps performed by the server 420 (such as the steps 454, 456, and 459) in greater detail. Similarly, FIG. 4B and its corresponding description below, describes the steps performed by the electronic devices 430 (such as the step 458) in greater detail.

Figure 7B:
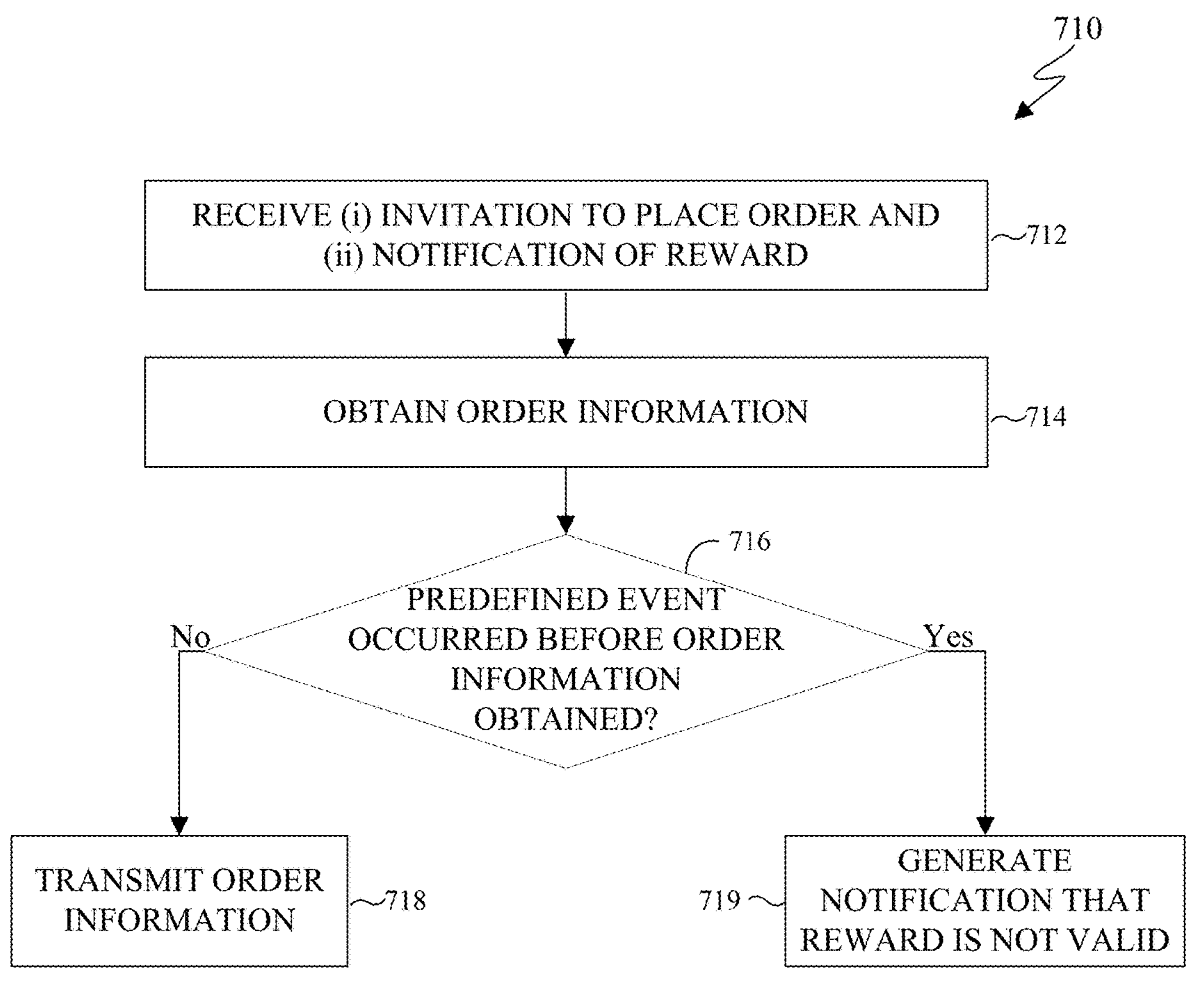
FIG. 7B illustrates an example method for additional consumers to place orders in accordance with an embodiment of this disclosure.
Figure 7C:
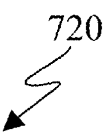
FIG. 7C illustrates an example method for a merchant to select an area that includes consumers to place group orders in accordance with an embodiment of this disclosure.
Figure 7C:
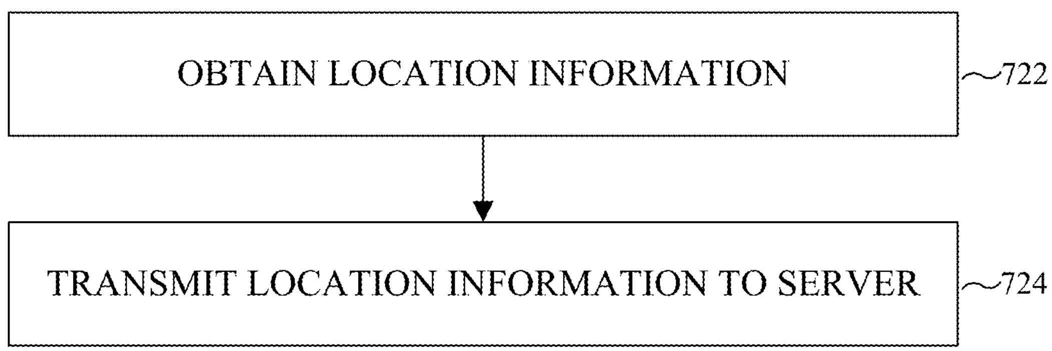

The timing diagram 400*b* of FIG. 4B is similar to the timing diagram 400*a* of FIG. 4A. However, the timing diagram 400*b* describes the process when initiated by the merchant, rather than a consumer. For example, in step 460, the electronic device 440 obtains a delivery area. For example, the electronic device 440 can display a map of an area around the location of the store and obtain an input selecting a particular location or a general area, denoted as a delivery area. The electronic device 440 then transmits the delivery area to the server 420. Step 460 is described in greater detail below in the method 720 as illustrated in FIG. 7C.

After the server 420 receives the delivery area from the electronic device 440, the server in step 454, can identify potential customers in the delivery area as part of a process to improve the efficiency and uptake of the network of nodes for physically fulfilling orders within the delivery area. For example, the server 420 can utilize information from an information repository (such as the information repository 240 of FIG. 2) to identify potential persons who are in the delivery area. According to various embodiments, the information repository may be populated with data from geofencing parameters for an application executing on the potential persons' devices (for example, smartphones). More specifically, in certain embodiments, an application for receiving orders receives data from a central server (for example, server 420) for geofencing the functionality of the application. Examples of geofencing include only permitting orders to be received within a defined geographical area, or for subdividing a geographical area into one or more regions in which the functionality of the app, or physical fulfillment of orders is subject to one or more constraints (for example, small orders may only be possible within a subset of a geographic area which can be reached by small delivery vehicles such as bicycles or mopeds). For instance, the server 420 can compare addresses of previous customers to the selected area. The server 420 can then filter the addresses of previous customers based on a distance to the delivery area. For example, the server 420 can select previous customers whose address are within a predefined distance to the delivery area.

In step 456, the server 420 can generate and transmit a notification to the selected customers (identified potential users who are in the selected delivery area). The notification can be sent via a push notification, a text message, an email, or the like. In certain embodiments, the notifications may be provided through one or more of an in-app message.

In certain embodiments, to increase the number of orders in a temporal or physical window, thereby increasing the efficiency, throughput, or some other metric of system performance, the notification can include an incentive for the person to place an order. In certain embodiments, the notification can include a time window during which the order is to be received, in order to obtain the incentive. The incentive can be a discount of the goods purchase, a discount on the delivery, or the like. The notification can also indicate that the incentive is only available if the order is to be delivered to a certain address (such as the address that is indicated in the information repository and associated with the customer).

The notifications can be received by the electronic devices 430 via a network. When one or more of the electronic devices 430 receive the notification, none, one or more of the electronic devices 430 may transmit an order, that is received by the server 420 (step 458). For example, the electronic devices 430 can provide the notification to the user (such as by displaying the notification on a display such as the display 355 of FIG. 3 or audibly projecting the notification via a speaker such as the speaker 330 of FIG. 3). The user can decide whether to place an order.

The incentive provided in the notification can expire upon satisfaction of one or more predefined criteria, for example, after a certain period of time or after a predefined event occurs. The predefined event can be that the order is full. For example, if the vehicle used to deliver the received orders to the selected area is at capacity, the incentive can expire.

One or more of the electronic devices 430 can obtain an order (via an input from a user) and transmit the obtained order to the server 420.

After a certain period of time or after a predefined event occurred, the server 420 concludes the group order (orders from the electronic device 410 associated with customer #1 and zero or more electronic devices 430) and generates a route to deliver the group order (step 459). The delivery route can be optimized in order to deliver the order in the least amount of time. In certain embodiments, the server 420 can determine to use additional delivery vehicles to deliver the group order.

Although FIG. 4A illustrates the timing diagram 400*a* and FIG. 4B illustrates the timing diagram 400*b*, various changes may be made to FIGS. 4A and 4B. For example, while the timing diagrams 400*a* and 400*b* are shown as a series of steps, various steps could overlap, occur in parallel, occur in a different order, or occur multiple times. In another example, steps may be omitted or replaced by other steps. For example, steps of the timing diagrams 400*a* and 400*b* can be executed in a different order.

FIGS. 5A-5D illustrate example maps in conjunction with methods for optimizing the efficiency or throughput of a network of nodes for physically fulfilling an order accordance with certain embodiments of this disclosure. The illustrative examples of FIGS. 5A-5D comprise maps for arranging multiple orders in a similar geographic area in accordance with embodiments of this disclosure. The maps of FIGS. 5A-5D are for illustration only and other embodiments can be used without departing from the scope of the present disclosure.

FIG. 5A illustrates an example map 500 that is divided into multiple areas (denoted as trade zones), such as areas 506*a*, 506*b*, 506*c*, 506*d*, 506*e*, and 506*f* (together denoted as areas 506). Each area could be associated with a particular store. Some areas, such as areas 506*a*, 506*b*, 506*c*, include nodes of a network of resources for physically fulfilling an order, such as stores 502*a*, 502*b*, and 502*c*, respectively (together denoted as stores 502). Other areas, such as 506*d*, 506*e*, and 506*f* have stores that are located beyond the instant view of the map 500. Each of the stores 502 can be a franchised restaurant that has a delivery boundary, such as boundary 504. For example, store 502*a* can deliver orders only within the area 506*a*. For example, store 502*a* can deliver orders only within the area 506*a*. Additionally or alternatively, the store 502*a* can have a delivery boundary, such as boundary 504, beyond which it does not delivery goods or services. In certain embodiments, the store 502*a* can be a standalone store that determines that it is not economical to delivery orders beyond the boundary 504.

Figure 5B:
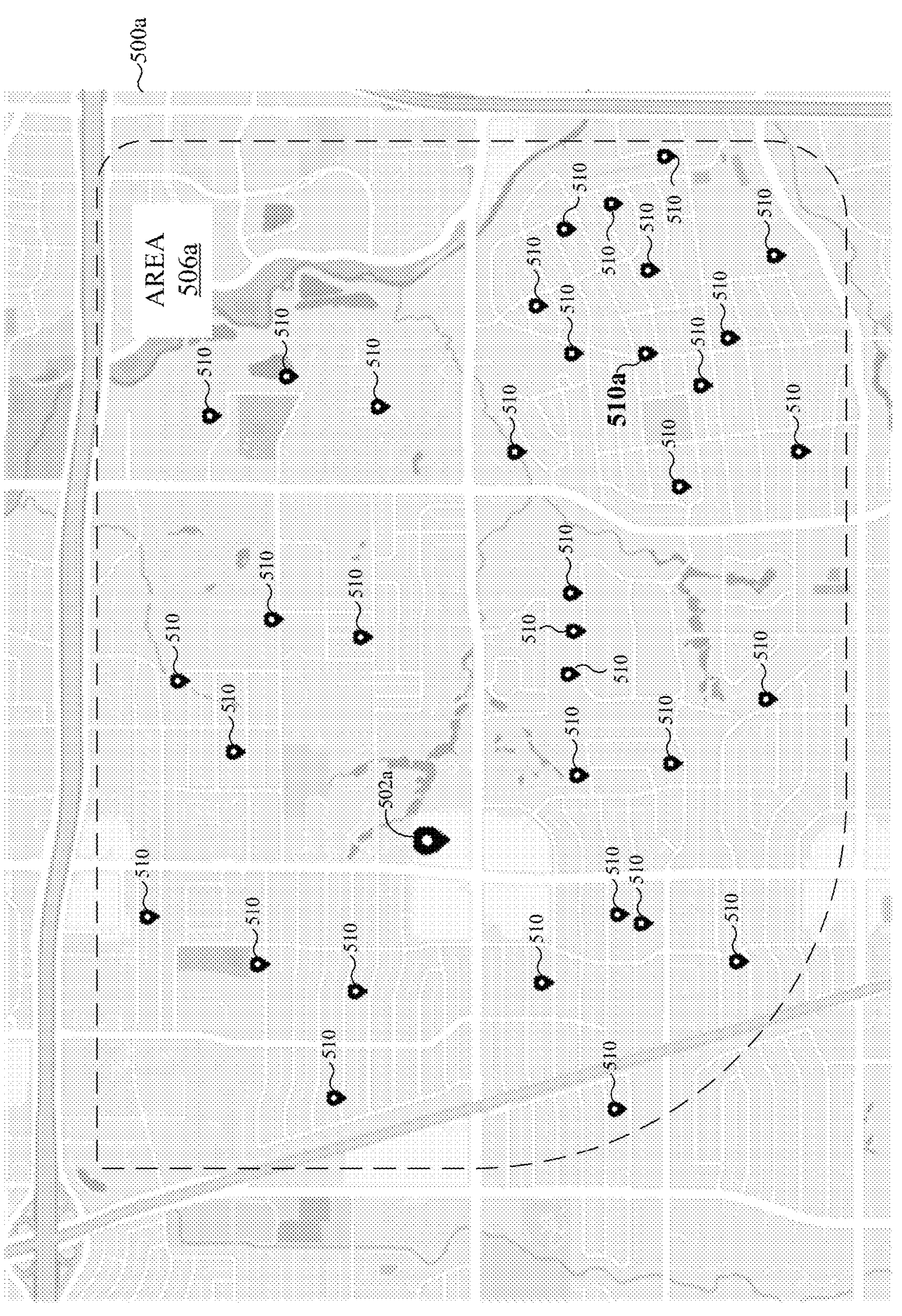

FIG. 5B illustrates the map 500*a* which is an enlarged and zoomed-in version of the map 500 of FIG. 5A. The map 500*a* is of the area 506*a* and includes the store 502*a* and locations 510 of previous deliveries. The locations 510 can be stored in an information repository, such as the information repository 240 of FIG. 2A. The information repository can include a table listing contact information (such as email, telephone number, and the like), previous orders, demographic information, and the like associated with each of the locations 510.

Figure 5C:
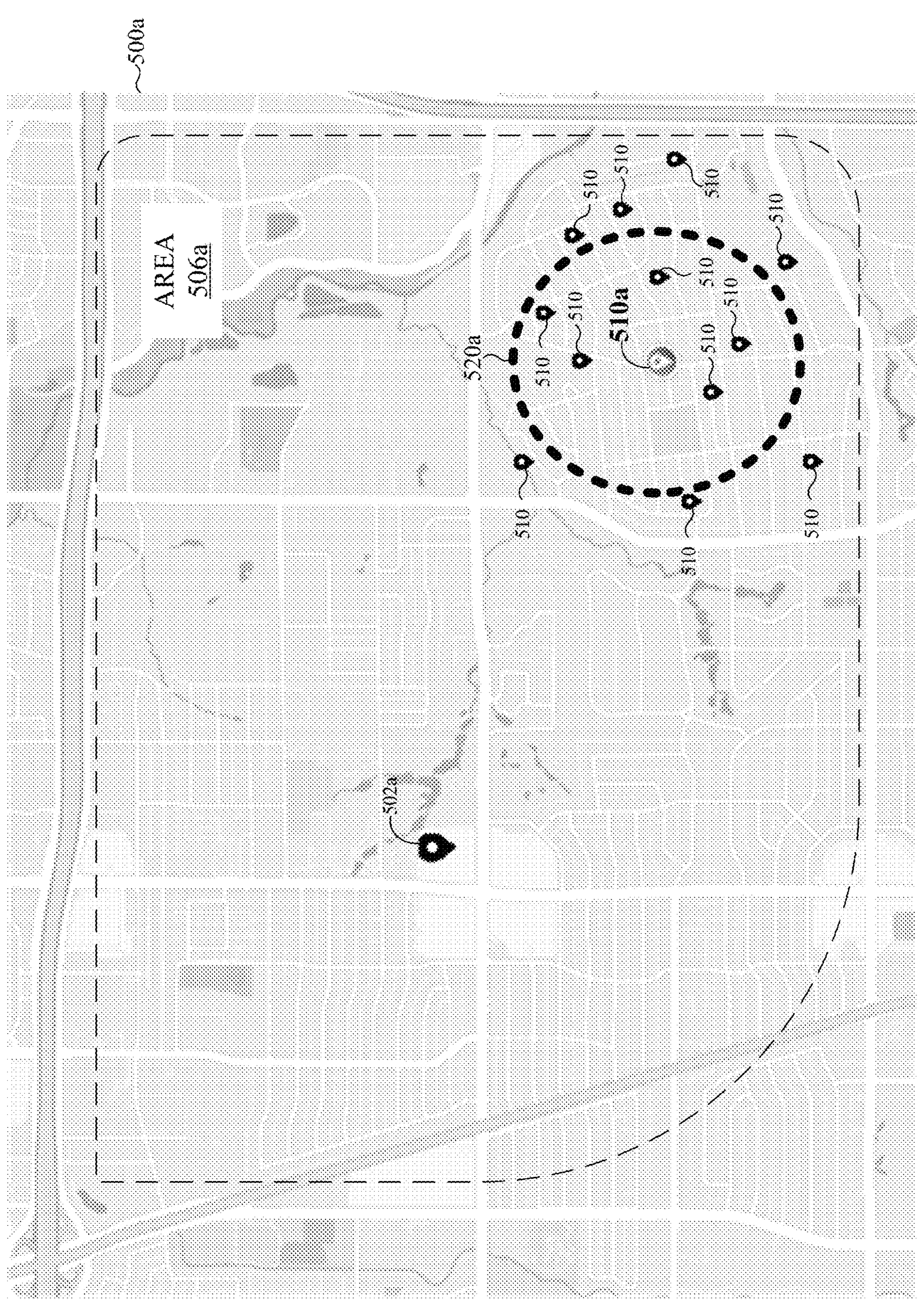

FIG. 5C illustrates the map 500*a* after an event occurs. For example, a customer at location 510*a* places can place an order (such as described in the timing diagram 400*a* of FIG. 4A) or a merchant selects an area at or near the location 510*a* (such as described in the timing diagram 400*b* of FIG. 4B). A server, such as the server 420 of FIGS. 4A and 4B can generate a delivery zone 520*a* and identify potential customers within the delivery zone 520*a*. The delivery zone can be based on a particular distance from the location 510*a*. As illustrated six potential customers are included in the delivery zone 520*a* as indicted by the locations 510 and 510*a*.

In certain embodiments, the server 420 can transmit notifications to the six potential customers which are located in the delivery zone 520*a*. In other embodiments, the server 420 can optimize the delivery zone. For example, the size of the delivery zone can be increased or decreased. For instance, the size of the delivery zone can change based on the demographics of area. If the delivery zone includes more multiple family housing units (such as apartment complexes) or office complexes as compared to single-family homes, may enable the delivery zone to be enlarged since the delivery drive would likely make less stops in the area. Alternatively, if the delivery zone includes more single-family homes as compared to multiple family housing units (such as apartment complexes) or office complexes, may cause the delivery zone to be reduced since the delivery driver would likely make more stops within the area.

Figure 5D:
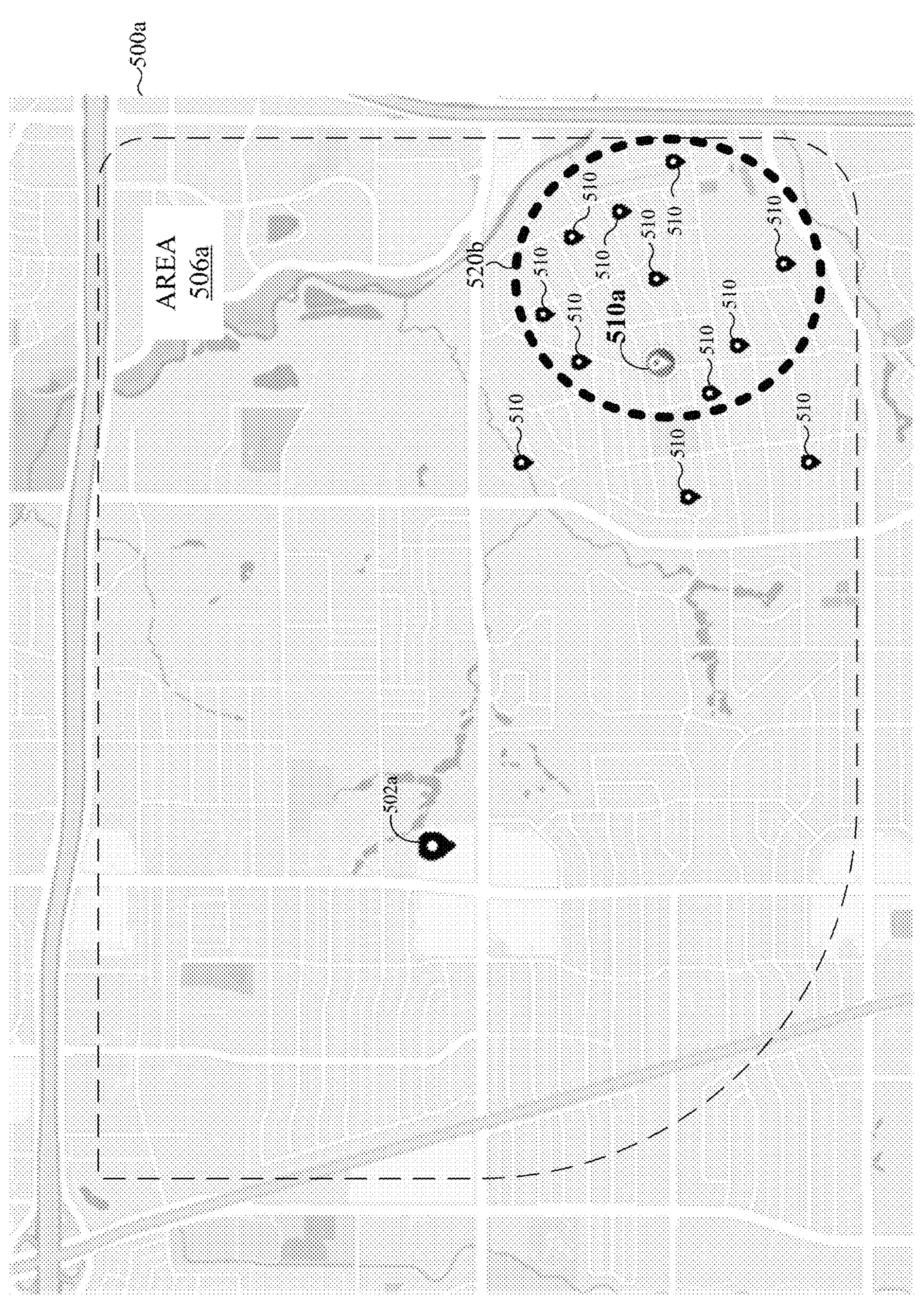

The delivery zone can be optimized by redefining the boundaries of the delivery zone, thereby shifting the area covered such that the delivery zone is not centered over the location 510*a*, in order to increase the number of potential customers are included in the delivery zone. As illustrated in FIG. 5D, the delivery zone 520*b* (which is a similar size to the delivery zone 520*a*) is shifted in one or more directions to increase number of potential customers from six (as illustrated in FIG. 5C) to ten.

Although FIGS. 5A-5D illustrate various images and maps, various changes may be made to FIGS. 5A-5D. For example, FIGS. 5A-5D are merely meant to illustrate examples of the types of results that could be obtained using the approaches described in this disclosure. Obviously, images of scenes can vary widely, and the results obtained using the approaches described in this patent document can also vary widely depending on the circumstances.

Figure 6A:
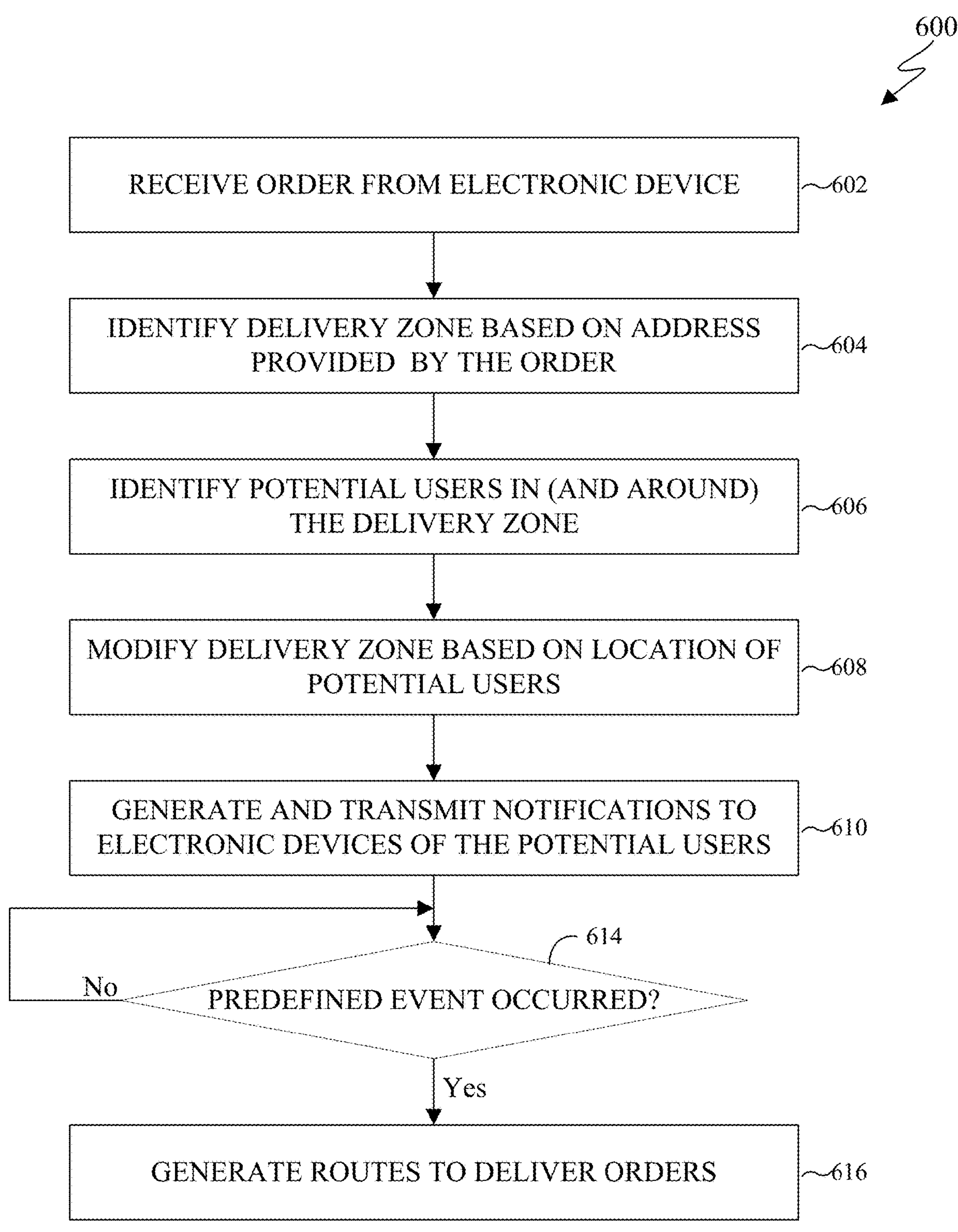
FIGS. 6A and 6B illustrate example methods for arranging multiple orders in a similar geographic area in accordance with an embodiment of this disclosure.
Figure 6B:
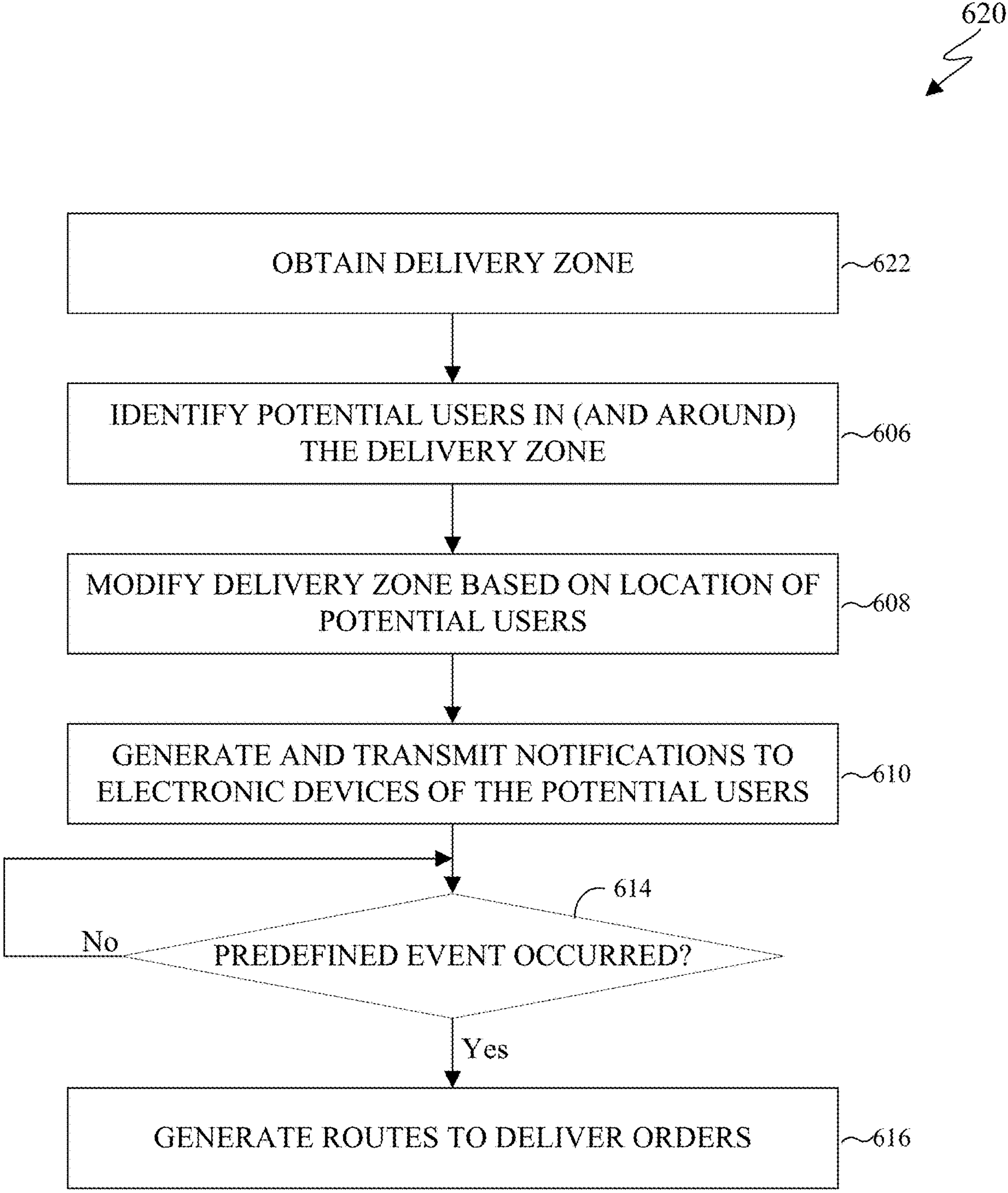

FIGS. 6A and 6B illustrate operations of example methods 600 and 620, respectively, for arranging multiple orders in a similar geographic area in accordance with an embodiment of this disclosure. The steps of the method 600 of FIG. 6A the method 620 of FIG. 6B can be performed by the server 104 of FIG. 1 or the server 420 of FIGS. 4A and 4B and include internal components similar to the server 200 of FIG. 2. The methods 600 and 620 and are for illustration only and other embodiments can be used without departing from the scope of the present disclosure.

Referring to the non-limiting example of FIG. 6A, in step 602 a server (such as server 200 or server 420 of FIGS. 4A and 4B) receives an order from an electronic device (such as electronic device 410 of FIG. 4A). The order can include an indication that the order is to be delivered to a certain address.

In step 604, the server 200 identifies a delivery zone. The delivery zone can be a predetermined size that is located around the address provided by the order.

In step 606, the server 200 identifies potential users within the delivery zone. In certain embodiments, the server 200 identifies one or more additional potential users within a distance outside the delivery zone.

In step 608, the server 200 modifies the delivery zone based on location of one or more additional potential that are located outside the delivery zone. The server 200 can modify the delivery zone to increase or decrease the numbers of potential users. The server 200 can modify the delivery zone to increase or decrease the size orders, based on history from the users in and around the delivery zone. For example, if the vehicle used to deliver the orders is small, the delivery zone can be modified to occupy an area that is known for having smaller orders. Conversely, if the vehicle used to deliver the orders is large, the delivery zone can be modified to occupy an area that is known for having larger orders.

In step 610, the server 200 generates and transmits notifications the potential users in the modified delivery zone. The notification can include an incentive (such a reduced fees, discounts of food and/or beverages) and a time limit to place the order.

In step 614, the electronic device determines whether a predefined event occurs. The predefined event can be that the timer associated with a fulfilment window has expired. The predefined event can be that a maximum number of orders are received. For example, the number of orders received can be limited in order to deliver the food orders in a timely manner. The predefined event can be that the orders received nearly exceed the allowed storage in the delivery vehicle. For example, a delivery vehicle has a maximum amount of space, once all the space is occupied, then a second vehicle would be needed to make the delivery, or the vehicle would need to make multiple return trips to the store to pick up the orders that did not originally fit in the vehicle.

Upon a determination that the predefined event did not occur the server 200 waits until the predefined event occurs. Upon a determination that the predefined event occurs the server 200 generates routes to deliver the orders.

As illustrated in FIG. 6B, in step 622 a server (such as the server 200) receives an indication of a delivery zone from an electronic device (such as the electronic device 440 of FIG. 4B). The delivery zone could be a centered around a geographic location (such as a physical address), a particular neighborhood, or the like.

In step 606, the server 200 identifies potential users within the delivery zone. In certain embodiments, the server 200 identifies one or more additional potential users within a distance outside the delivery zone.

In step 608, the server 200 modifies the delivery zone based on location of potential users. The server 200 can modify the delivery zone to increase or decrease the numbers of potential users. The server 200 can modify the delivery zone to increase or decrease the size orders, based on history from the users in and around the delivery zone. For example, if the vehicle used to deliver the orders is small, the delivery zone can be modified to occupy an area that is known for having smaller orders. Conversely, if the vehicle used to deliver the orders is large, the delivery zone can be modified to occupy an area that is known for having larger orders.

In step 610, the server 200 generates and transmits notifications the potential users in the modified delivery zone. The notification can include an incentive (such a reduced fees, discounts of food and/or beverages) and a time limit to place the order.

In step 614, the electronic device determines whether a predefined event occurs. The predefined event can be that the timer expired. The predefined event can be that a maximum number of orders are received. For example, the number of orders received can be limited in order to deliver the food orders in a timely manner. The predefined event can be that the orders received nearly exceed the allowed storage in the delivery vehicle. For example, a delivery vehicle has a maximum amount of space, once all the space is occupied, then a second vehicle would be needed to make the delivery, or the vehicle would need to make multiple return trips to the store to pick up the orders that did not originally fit in the vehicle.

Upon a determination that the predefined event did not occur the server 200 waits until the predefined event occurs. Upon a determination that the predefined event occurs the server 200 generates routes to deliver the orders.

Although FIG. 6A illustrates operations of example method 600 and FIG. 6B illustrates of example method 620, the present disclosure contemplates and encompasses changes may be made to FIGS. 6A and 6B. For example, while the methods 600 and 620 are shown as a series of steps, various steps could overlap, occur in parallel, occur in a different order, or occur multiple times. In another example, steps may be omitted or replaced by other steps. For example, steps of the method 600 and the method 620 can be executed in a different order. For another example, step 608 can be omitted from the methods 600 and 620.

FIG. 7A illustrates operations of an example method 700 for a consumer placing an order in accordance with various embodiments of this disclosure. FIG. 7B illustrates example method 710 for additional consumers to place orders in accordance with embodiments of this disclosure. FIG. 7C illustrates example method 720 for a merchant to select an area that consumers to place group orders in accordance with certain embodiments of this disclosure.

The steps of the method 700 of FIG. 7A can be performed by any of the client devices 106-114 of FIG. 1 and the electronic device 410 of FIG. 4A and include internal components such as described with reference to the electronic device 300 of FIG. 3. Similarly, steps of the method 710 of FIG. 7B can be performed by any of the client devices 106-114 of FIG. 1 and the electronic devices 430 of FIGS. 4A and 4B and include internal components similar to the electronic device 300 of FIG. 3. Additionally, the steps of the method 720 of FIG. 7C can be performed by any of the client devices 106-114 of FIG. 1 and the electronic device 440 of FIG. 4B and include internal components similar to the electronic device 300 of FIG. 3. The methods 700, 710, and 720 are for illustration only and other embodiments can be used without departing from the scope of the present disclosure.

As illustrated in FIG. 7A, an electronic device (such as the electronic device 300 of FIG. 3 or the electronic device 410 of FIG. 4A) obtains order information (step 702). The order information can be obtained via an input from a user. In step 704, the electronic device transmits the order information to a server (such as the server 420 of FIG. 4A). The server can be associated with a store. In step 706, the electronic device can receive from the server an indication of a reward.

As illustrated in FIG. 7B, an electronic device (such as the electronic device 300 of FIG. 3 or one of the electronic device 430 of FIGS. 4A and 4B) receive a notification (step 712). The notification can include an invitation to place an order within a certain time. The notification can include reward information. The reward information can include discounts of food or beverages. The reward information can include an indication of discounted delivery.

In step 714, the electronic device obtains order information. The order information can be obtained via an input from a user. In step 716, the electronic device determines whether a predefined event occurs before the order information is obtained. The predefined event can be whether a timer expires. For example, the electronic device can determine whether the certain time period included in the notification (of step 712) expired. The predefined event can be whether an indication is received from the server indicating that a maximum number of orders is reached. The predefined event can be whether an indication is received from the server indicating that the delivery vehicle is out of space.

In response to a determination that a predefined event does not occur (as determined in step 716), the electronic device in step 718 transmits the order information. In response to a determination that a predefined event occurs (as determined in step 716), the electronic device in step 719 generates a notification that the reward is not valid. The electronic device can still submit the order in hopes that a new reward will be issued. For example, if additional orders are placed in proximity to the delivery location associated with the order information of step 714, new rewards can be issued.

As illustrated in FIG. 7C, an electronic device (such as the electronic device 300 of FIG. 3 or the electronic device 440 of FIG. 4B) obtains a location information (step 722). For example, the electronic device can display, via a display (such as the display 355 of FIG. 3), a map. The electronic device can then receive an input via the input (such as the input 350 of FIG. 3), selecting a portion of the map. In step 724, the selected location is transmitted to a server. The server can look up customer address that are in and around the selected location.

Although FIG. 7A illustrates the method 700, FIG. 7B illustrates the method 710, and FIG. 7C illustrates the method 720 various changes may be made to the example methods described with reference FIGS. 7A-7C. For example, while the methods 700, 710, and 720 are shown as a series of steps, various steps could overlap, occur in parallel, occur in a different order, or occur multiple times. In another example, steps may be omitted or replaced by other steps. For example, the present disclosure contemplates embodiments wherein steps of the method 700, the method 710, and the method 720 can be executed in a different order.

Figure 8:
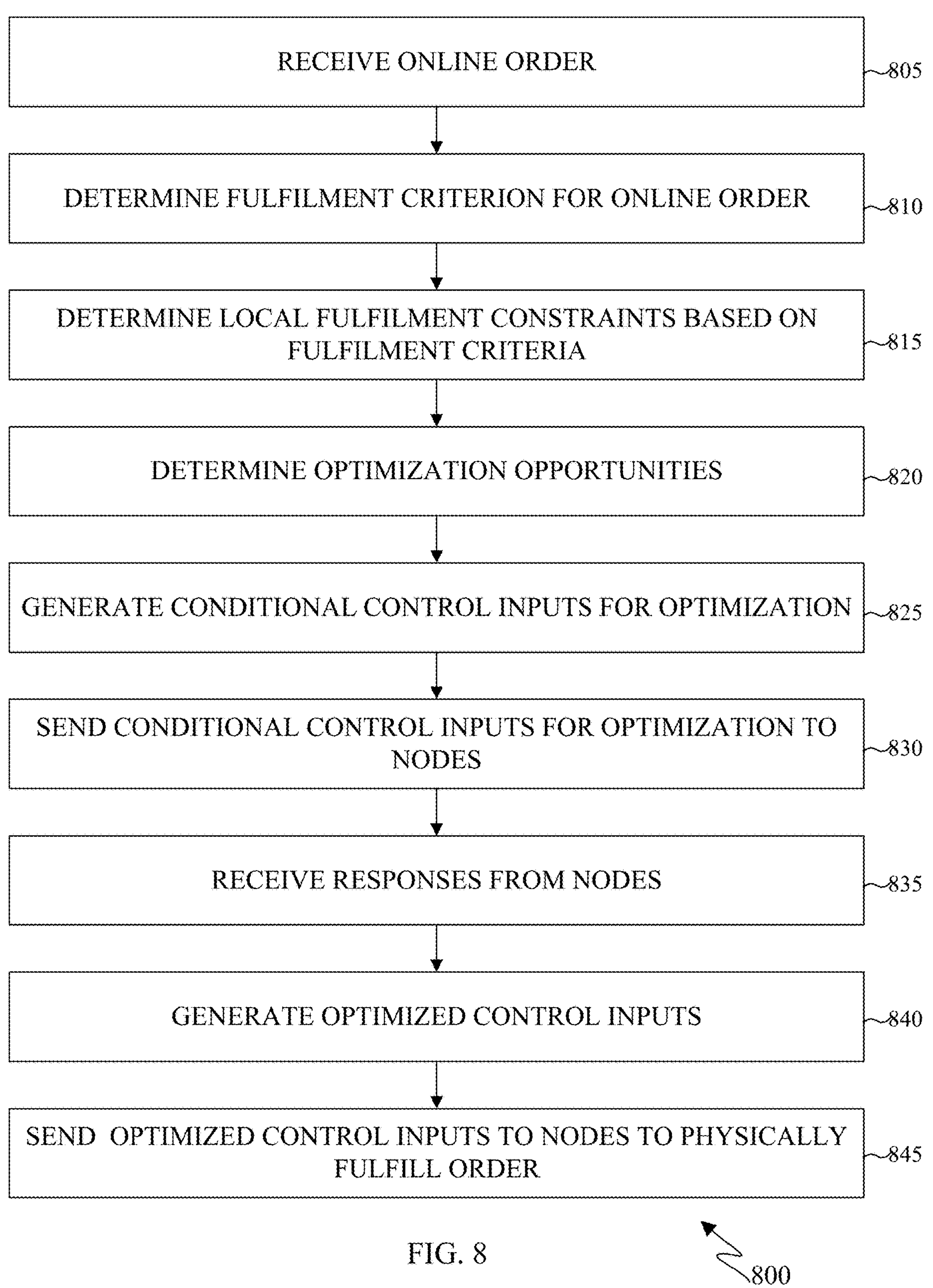
FIG. 8 illustrates operations of an example method performed at a back-end server for optimizing at least one metric of system performance according to various embodiments of this disclosure.

FIG. 8 illustrates operations of a method 800 implementing control logic for optimizing one or more metrics of system performance of a network of physical nodes (for example, system 100 in FIG. 1) for physically fulfilling an order received over a network. According to certain embodiments, the operations described with reference to FIG. 8 are implemented as part of an algorithm or code executing at one or more back-end servers (for example, server 200 in FIG. 2) or cloud-based versions thereof.

Referring to the illustrative example of FIG. 8, at operation 805, a back-end server (for example, server 200 in FIG. 2) communicatively connected via a network (for example, network 102 in FIG. 1) to the nodes of a system for physically fulfilling an order receives an order from. According to various embodiments, each node of the system comprises at least one client device (for example, electronic device 300 in FIG. 3) which is connected to the back-end server performing the operations of method 800. In some embodiments, the client device at the node is further connected to a physical system (for example, an IoT device, a navigation unit, an autonomous vehicle, a 3-D printer) operating at least in part, under the control of the client device. In some embodiments, the client device is connected to a display or communication interface for providing instructions to a human tasked with operating an apparatus (for example, an oven, a lathe, or a vehicle) for physically fulfilling some aspect of the order. In this illustrative example, the order received at operation 805 specifies, at a minimum, a quantity (i.e., a number of units) to be fulfilled and a location for their fulfilment. According to various embodiments, the order may further specify additional parameters of the order, such as a type (for example, a flavor, or set of pizza toppings) and a temporal requirement (for example, a delivery date or time, or an expiration time).

As shown in the illustrative example of FIG. 8, at operation 810, the apparatus performing method 810 determines, based on the order received at operation 805, fulfilment criteria for physically fulfilling the order. According to various embodiments, the physical fulfilment criteria may be calculated or obtained based on rules maintained in an information store at the server. Returning to the familiar example of a system for physically fulfilling food delivery orders, the fulfilment criteria for the order may comprise materials to be used and operations to be performed a first node of the system to cook the ordered food, and a second node (for example, a driver or autonomous vehicle) to deliver the vehicle. In certain embodiments, the physical fulfilment criteria may be determined based on a machine learning (ML) model trained upon data from prior fulfilment operations. For example, where the criteria include the materials required for fulfilling an order, there may be a difficult-to-predict disparity between a specified quantity of materials (for example, an amount of flour per unit indicated by a recipe) and a real-world number of materials per unit, taking into account node-specific factors such as waste, error and spoliation.

Referring to the illustrative example of FIG. 8, at operation 815, the server determines the fulfillment constraints associated with the order. According to various embodiments, the fulfillment constraints may be local or general. Examples of local constraints include the number of nodes within a delivery area or other geographic boundary of a network of resources for physically fulfilling the order. Examples of general constraints include the time required to perform a physical task (for example, regardless of location, baking a pizza takes ~10-15 minutes). Another example of a constraint, which depending on the heterogeneity of the nodes, can be general or local, is node production capacity (sticking with pizza-based examples, node production capacity may refer to the number of pizzas an individual restaurant of a network of restaurants can produce per hour). In some embodiments, fulfillment constraints may also be temporal, such as delivery times.

Depending on the constraints, the determination of fulfillment constraints may be based on one or more of the fulfillment criteria determined at operation 810, polling one or more of an information store at the back-end server or a node of the network, retrieving stored constraint values from a memory, or determining the constraints based on a trained model implemented at the server. As a non-limiting example of polling an information store, the back-end server may determine, based on stored data of recent orders, which nodes of a network comprise drivers in the correct geographical area who are presently free to deliver a received order. As an illustrative example of polling a node of a network, the server may request information from a node (for example, a restaurant's kitchen) as to current capacity to fill orders. Depending on embodiments, it may be more efficient to poll the restaurant regarding current available capacity, rather than have the node report walk-in traffic and reservations. As an illustrative example of retrieving stored constraints from a memory, the server may look up a delivery address from a map application to determine a delivery distance. As a non-limiting example of using a machine learning model to determine fulfillment constraints, a machine learning model may be trained to determine traffic conditions for a given locale and time, as distance can often be a poor predictor of travel time (for example, the time required to travel a mile in Sao Paolo greatly differs from the time required to travel a mile in Sandusky).

Referring to the illustrative example of FIG. 8, at operation 820, the server determines, based on the intersection of fulfilment criteria and fulfilment constraints, a set of potential optimization opportunities. As used in this disclosure, the expression "optimization opportunities" encompasses additional orders or modifications to the received order which, if implemented increase one or more metrics (for example, efficiency or system throughput) of system performance of the network of nodes for physical fulfillment of the order received at operation 805. Examples of optimization opportunities include geographic bundling (for example, trying to generate or consolidate multiple orders within a geographic area, or within a group of users within a geographic area). Additional examples of optimization opportunities include load spreading, wherein physical fulfillment of an order is divided between multiple production nodes to either meet a larger demand or fulfill the order quickly (for example, where one restaurant could fulfill an order in its entirety by itself, but the order could be fulfilled more quickly by two restaurants). Further examples of optimization opportunities include, without limitation, time bundling, wherein the pacing of orders is adjusted to better match the projected availability of resources.

As shown in the illustrative example of FIG. 8, at operation 825, the server generates one or more conditional optimization inputs. As used in this disclosure, the expression "conditional optimization input" encompasses an input or prompt for an input sent to a node of the system, which, if satisfied, triggers a further order whose fulfilment increases one or more metrics of system performance, such as efficiency or throughput. Examples of conditional optimization inputs include, without limitation, messages to fulfilment nodes of a network advising them of an incoming additional order associated with an optimization opportunity. Further examples of conditional optimization inputs include, without limitation, messages to users who have already placed orders offering incentives for temporal modification of the fulfilment of their order (for example, earlier or later delivery times) associated with optimization opportunities. Still further examples of conditional optimization inputs include, without limitation, messages to past users satisfying one or more fulfilment constraints offering incentives for placing new orders, thereby realizing optimization opportunities associated with increased throughput.

Referring to the illustrative example of FIG. 8, at operation 830, the server sends, over a network, the conditional optimization inputs generated at operation 825 to the nodes identified as being candidates for performing optimization operations. Depending on embodiments, at operation 830, the server also sets a timer defining an optimization window during which responses from the candidate nodes may be received. According to some embodiments, the duration of the optimization window is dynamically determined based on one or more of the fulfilment criteria for each of the one or more optimization opportunities and a local fulfilment constraint for each of the one or more optimization opportunities. As an illustrative example, in an instance where the optimization input comprises a message to a potential customer in the vicinity of the customer who placed the order received at operation 805, advising the potential customer of a discount on orders placed within an optimization window, the optimization window may be dynamically determined as the difference between the shelf life of a hot pizza and the cooking time and the delivery time. According to certain embodiments, the cooking time may be based on rules or tabular values kept in an information store (for example, where, apart from high-altitude locations, the cooking time is always the same), while the delivery time may be dynamically determined by polling an outside data repository or consulting a machine model trained on data regarding local traffic conditions.

As shown in FIG. 8, at operation 835, the system receives via the network, during the optimization window, at least one response from a node indicating satisfaction of a condition of a conditional optimization input. Examples of responses indicating satisfaction of a condition of a conditional optimization input include, without limitation, a potential customer indicating accepting, via a network message, an incentivized offer of a discounted good, or an existing customer accepting, through an interaction with an application executing at a client device, an offer to adjust the delivery time of their order.

Referring to the non-limiting example of FIG. 8, at operation 840, the server generates a set of optimized control inputs for physically fulfilling both the initial order received at operation 805 and one or more orders received at operation 835 associated with satisfaction of conditions of the conditional optimization input. According to certain embodiments, the set of optimized control inputs comprises at least one control input to each node performing a task for physically fulfilling both the original order and the order(s) received at operation 835.

According to various embodiments, at operation 845, the optimized control inputs generated at operation 840 are sent, via the network to each of the nodes of the network performing at least one task for fulfilling the original order and the order(s) received at operation 835.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with selected exemplary embodiments, various changes and modifications may be suggested to one skilled in the art. It is intended that the present disclosure encompass such changes and modifications as fall within the scope of the appended claims.

What is claimed is:

1. A method, comprising:

receiving, at a computing platform communicatively connected to a system of nodes, an initial order to be physically fulfilled by one or more nodes of the system of nodes, wherein the initial order specifies a location and quantity parameters of fulfilment;

generating, at the computing platform, a fulfilment criterion for the initial order using a first machine learning predictive model, wherein the first machine learning predictive model is trained upon data from prior fulfilment operations to generate predictions on future fulfilment criterion, wherein the fulfilment criterion is based on the quantity parameters of fulfilment;

generating, at the computing platform, a local fulfilment constraint for the initial order using a second machine learning predictive model, wherein the second machine learning predictive model is trained to generate baseline predictions of an effect produced by the local fulfilment constraint;

generating, based on at least one of the initial order, the fulfilment criterion for the initial order, and the local fulfilment constraint for the initial order, one or more conditional optimization opportunities, wherein each of the one or more conditional optimization opportunities comprises an action, which if taken, improves one or more performance metrics of the system of nodes;

generating a conditional input for optimization, wherein the conditional input for optimization defines an additional task to be taken by a node of the system;

sending the conditional input for optimization to a plurality of candidate nodes of the system of nodes, the plurality of candidate nodes identified based on satisfying the local fulfillment constraint generated for the initial order;

determining a dynamic optimization window based on the fulfilment criterion and the local fulfilment constraint, the dynamic optimization window defining a period of time during which responses from the plurality of candidate nodes are receivable by the computing platform;

receiving, within the dynamic optimization window, a response from at least one candidate node of the plurality of candidate nodes, wherein the response satisfies a condition of the conditional input for optimization;

generating, based at least in part on the response from the at least one candidate node, an optimized set of control inputs, wherein the optimized set of control inputs define actions to be taken by nodes to physically fulfil the initial order and perform the additional task to realize at least one of the one or more conditional optimization opportunities; and sending the optimized set of control inputs to the nodes for physically fulfilling the initial order and realizing the at least one of the one or more conditional optimization opportunities.

2. The method of claim 1, wherein the one or more performance metrics comprise at least one of system efficiency or throughput of the system of nodes.

3. The method of claim 1, wherein the one or more conditional optimization opportunities comprise at least one of geographic bundling of orders, load spreading of tasks associated with fulfilment of the initial order, or time bundling of orders.

4. The method of claim 1, wherein at least one of the optimized control inputs are received by a processor at a node, and the at least one of the optimized control inputs comprises instructions initiating a physical action by a system controlled by the processor.

5. The method of claim 4, wherein the physical action by the system comprises causing the node navigating to a location associated with the initial order.

6. The method of claim 4, wherein the physical action by the system comprises changing an on/off state of an apparatus at the node.

7. An apparatus, comprising:

a communication interface communicatively connected to one or more nodes of a system of nodes; and a processor configured to:

receive, at the apparatus, an initial order to be physically fulfilled by one or more nodes of the system of nodes, wherein the initial order specifies a location and quantity parameters of fulfilment;

generate a fulfilment criterion for the initial order using a first machine learning predictive model, wherein the first machine learning predictive model is trained upon data from prior fulfilment operations to generate predictions on future fulfilment criterion, wherein the fulfilment criterion is based on the quantity parameters of fulfilment;

generate a local fulfilment constraint for the initial order using a second machine learning predictive model, wherein the second machine learning predictive model is trained to generate baseline predictions of an effect produced by the local fulfilment constraint;

generate, based on at least one of the initial order, the fulfilment criterion for the initial order, and the local fulfilment constraint for the initial order, one or more conditional optimization opportunities, wherein each of the one or more conditional optimization opportunities comprises an action, which if taken, improves one or more performance metrics of the system of nodes;

generate a conditional input for optimization, wherein the conditional input for optimization defines an additional task to be taken by a node of the system;

send the conditional input for optimization to a plurality of candidate nodes of the system via the communication interface, the plurality of candidate nodes identified based on satisfying the local fulfillment constraint generated for the initial order;

determine a dynamic optimization window based on the fulfilment criterion and the local fulfilment constraint, the dynamic optimization window defining a period of time during which responses from the plurality of candidate nodes are receivable by the apparatus;

receive, within the dynamic optimization window, a response from at least one candidate node of the plurality of candidate nodes, wherein the response satisfies a condition of the conditional input for optimization;

generate based at least in part on the response from the at least one candidate node, an optimized set of control inputs, wherein the optimized set of control inputs define actions to be taken by nodes to physically fulfil the initial order and perform the additional task to realize at least one of the one or more conditional optimization opportunities; and send the optimized set of control inputs to the nodes for physically fulfilling the initial order and realizing the at least one conditional optimization opportunities.

8. The apparatus of claim 7, wherein the one or more performance metrics comprise at least one of system efficiency or throughput of the system of nodes.

9. The apparatus of claim 7, wherein the one or more conditional optimization opportunities comprise at least one of geographic bundling of orders, load spreading of tasks associated with fulfilment of the initial order, or time bundling of orders.

10. The apparatus of claim 7, wherein at least one of the optimized control inputs are received by a processor at a node, and the at least one of the optimized control inputs comprises instructions initiating a physical action by a system controlled by the processor.

11. The apparatus of claim 10, wherein the physical action taken by the system comprises causing the node navigating to a location associated with the initial order.

12. The apparatus of claim 10, wherein the physical action by the system comprises changing an on/off state of an apparatus at the node.

13. A non-transitory, computer-readable medium containing code that, when executed by a processor, causes an apparatus to:

receive, at the apparatus, an initial order to be physically fulfilled by one or more nodes of a system of nodes communicatively connected to the apparatus, wherein the initial order specifies a location and quantity parameters of fulfilment;

generate a fulfilment criterion for the initial order using a first machine learning predictive model, wherein the first machine learning predictive model is trained upon data from prior fulfilment operations to generate predictions on future fulfilment criterion, wherein the fulfilment criterion is based on the quantity parameters of fulfilment;

generate a local fulfilment constraint for the initial order using a second machine learning predictive model, wherein the second machine learning predictive model is trained to generate baseline predictions of an effect produced by the local fulfilment constraint;

generate, based on at least one of the initial order, the fulfilment criterion for the initial order, and the local fulfilment constraint for the initial order, one or more conditional optimization opportunities, wherein each of the one or more conditional optimization opportunities comprises an action, which if taken, improves one or more performance metrics of the system of nodes;

generate a conditional input for optimization, wherein the conditional input for optimization defines an additional task to be taken by a node of the system;

send the conditional input for optimization to a plurality of candidate nodes of the system of nodes, the plurality of candidate nodes identified based on satisfying the local fulfillment constraint generated for the initial order;

determine a dynamic optimization window based on the fulfilment criterion and the local fulfilment constraint, the dynamic optimization window defining a period of time during which responses from the plurality of candidate nodes are receivable by the apparatus;

receive, within the dynamic optimization window, a response from at least one candidate node of the plurality of candidate nodes, wherein the response satisfies a condition of the conditional input for optimization;

generate, based at least in part on the response from the at least one candidate node, an optimized set of control inputs, wherein the optimized set of control inputs define actions to be taken by nodes to physically fulfil the initial order and perform the additional task to realize at least one of the one or more conditional optimization opportunities; and send the optimized set of control inputs to the nodes for physically fulfilling the initial order and realizing the at least one conditional optimization opportunities.

14. The non-transitory computer-readable medium of claim 13, wherein the one or more performance metrics comprise at least one of system efficiency or throughput of the system of nodes.

* * * * *